United States Patent
Yu et al.

(10) Patent No.: US 10,602,503 B2
(45) Date of Patent: Mar. 24, 2020

(54) CONTROL INFORMATION FORMAT PROCESSING METHOD, BASE STATION, AND USER EQUIPMENT

(71) Applicant: HUAWEI TECHNOLOGIES CO., LTD., Shenzhen, Guangdong (CN)

(72) Inventors: Zheng Yu, Beijing (CN); Xingqing Cheng, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/995,255

(22) Filed: Jun. 1, 2018

(65) Prior Publication Data

US 2018/0288750 A1 Oct. 4, 2018

Related U.S. Application Data

(63) Continuation of application No. PCT/CN2015/096227, filed on Dec. 3, 2015.

(51) Int. Cl.
*H04W 72/04* (2009.01)
*H04L 1/00* (2006.01)
*H04W 72/14* (2009.01)

(52) U.S. Cl.
CPC ......... *H04W 72/042* (2013.01); *H04L 1/0003* (2013.01); *H04W 72/14* (2013.01)

(58) Field of Classification Search
None
See application file for complete search history.

(56) References Cited

U.S. PATENT DOCUMENTS

| | | | | |
|---|---|---|---|---|
| 9,124,411 B2* | 9/2015 | Yan | ..................... | H04W 72/042 370/329 |
| 2011/0188462 A1 | 8/2011 | Yoo et al. | | |
| 2012/0172048 A1* | 7/2012 | Kato | ..................... | H04L 5/0007 455/450 |
| 2012/0243499 A1 | 9/2012 | Moon et al. | | |
| 2013/0064193 A1 | 3/2013 | Moon et al. | | |
| 2014/0307696 A1* | 10/2014 | Choi | ..................... | H04L 1/0038 370/329 |

(Continued)

FOREIGN PATENT DOCUMENTS

| CN | 101998634 A | 3/2011 |
|---|---|---|
| CN | 102036305 A | 4/2011 |

(Continued)

OTHER PUBLICATIONS

R1-155922 NTT DOCOMO,"DCI design for Rel-13 low complexity MTC",3GPP TSG RAN WG1 Meeting #82bis, Malmö, Sweden, Oct. 5-9, 2015,,total 6 pages.

(Continued)

*Primary Examiner* — Anh Vu H Ly
(74) *Attorney, Agent, or Firm* — Fish & Richardson P.C.

(57) ABSTRACT

Example control information format processing methods, base stations, and apparatuses are described herein. One example method includes determining a control information format of downlink control information. When the control information format of the downlink control information is a first control information format, a first field included in the downlink control information corresponding to the first control information format indicates a valid setting. When the control information format of the downlink control information is a second control information format, a second field included in the downlink control information corresponding to the second control information format indicates an invalid setting. The downlink control information is then sent to user equipment (UE).

16 Claims, 10 Drawing Sheets

(56) References Cited

U.S. PATENT DOCUMENTS

| | | | |
|---|---|---|---|
| 2015/0049694 A1* | 2/2015 | Choi | H04L 5/0032 370/329 |
| 2015/0249974 A1* | 9/2015 | Lee | H04W 72/042 370/329 |
| 2015/0334692 A1 | 11/2015 | Yan et al. | |
| 2016/0100422 A1* | 4/2016 | Papasakellariou | H04L 1/1861 370/329 |
| 2016/0212734 A1* | 7/2016 | He | H04L 5/0055 370/329 |
| 2018/0026769 A1* | 1/2018 | Lee | H04L 1/00 370/329 |
| 2018/0176892 A1* | 6/2018 | Kim | H04W 72/0406 370/329 |
| 2018/0254874 A1* | 9/2018 | Wang | H04L 5/0053 370/329 |

FOREIGN PATENT DOCUMENTS

| | | |
|---|---|---|
| CN | 102725989 A | 10/2012 |
| CN | 103582098 A | 2/2014 |
| JP | 2013518535 A | 5/2013 |

OTHER PUBLICATIONS

Extended European Search Report issued in European Application No. 15909509.0 dated Oct. 15, 2018, 8 pages.

3GPP TS 36.212 V12.6.0 (Sep. 2015);3rd Generation Partnership Project;Technical Specification Group Radio Access Network;Evolved Universal Terrestrial Radio Access (E-UTRA);Multiplexing and channel coding(Release 12),total 95 pages.

3GPP TS 36.213 V121.0 (Sep. 2015);3rd Generation Partnership Project;Technical Specification Group Radio Access Network;Evolved Universal Terrestrial Radio Access (E-UTRA);Physical layer procedures(Release 12),total 241 pages.

International Search Report issued in International Application No. PCT/CN2015/096227 dated Aug. 24, 2016, 6 pages.

Office Action issued in Japanese Application No. 2018-528695 dated Aug. 26, 2019, 7 pages (with English translation).

Office Action issued in Chinese Application No. 201580072087.6 dated Apr. 26, 2019, 9 pages.

* cited by examiner

Downlink control information bears grant information

| 1 bit | ceil(log2(flo or($N_{DL}^{RB}/6$))) bits | 1 bit | 4 bits | 3 bits | 1 bit | 1 bit | 2 bits | 2 bits | x bits |
|---|---|---|---|---|---|---|---|---|---|

Labels (left to right): Grant differentiation indication | Narrowband index indication | Resource allocation within narrowband indication | TBS/MCS indication | HARQ process number indication | New data indicator | HARQ acknowledgment resource offset indication | DCI repetition number indication | Padding bits

Downlink control information bears control channel command information

| 1 bit | ceil(log2(flo or($N_{DL}^{RB}/6$))) bits are all 1 | 1 bit | 6 bits | 4 bits | 2 bits | 1 bit | x bits |
|---|---|---|---|---|---|---|---|

Labels (left to right): Grant differentiation indication | Narrowband index indication | Resource allocation within narrowband indication | Preamble index indication | Random access channel coverage enhancement level indication | Random access channel profile index indication | Redundant bits | Padding bits

FIG. 3

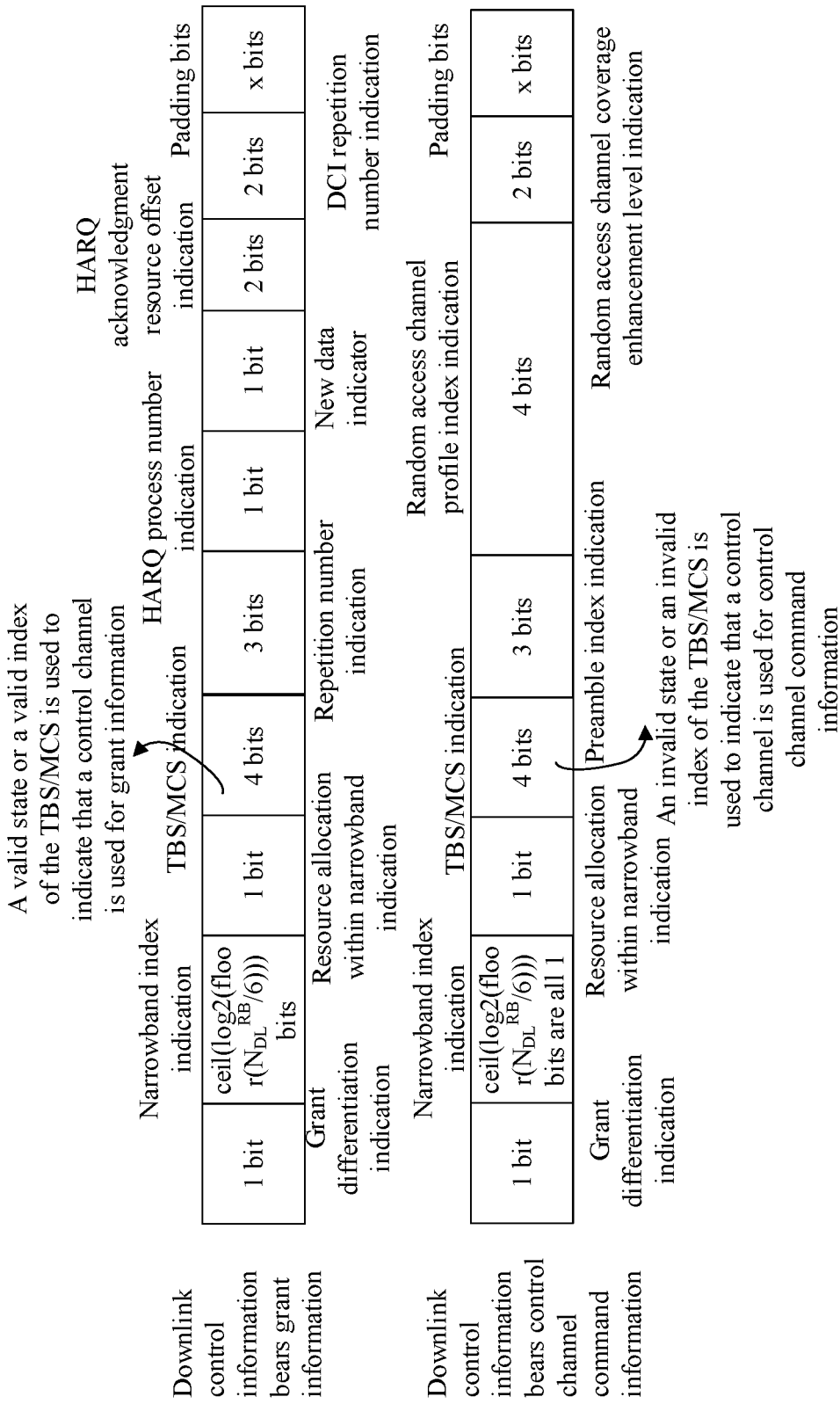
FIG. 4-a

Downlink control information bears grant information

| Narrowband index indication | Grant differentiation indication | Resource allocation within narrowband indication | TBS/MCS indication | Repetition number indication | HARQ process number indication | New data indicator | HARQ acknowledgment resource offset indication | DCI repetition number indication | Padding bits |
|---|---|---|---|---|---|---|---|---|---|
| ceil(log2(floor($N_{DL}^{RB}$/6))) bits | 1 bit | 1 bit | 4 bits | 3 bits | 1 bit | 1 bit | 2 bits | 2 bits | x bits |

A valid state or a valid index of the TBS/MCS is used to indicate that a control channel is used for grant information

Downlink control information bears control channel command information

| Narrowband index indication | Grant differentiation indication | Resource allocation within narrowband indication | TBS/MCS indication | Preamble index indication | Random access channel profile index indication | Random access channel coverage enhancement level indication | Padding bits |
|---|---|---|---|---|---|---|---|
| ceil(log2(floor($N_{DL}^{RB}$/6))) bits are all 1 | 1 bit | 1 bit | 4 bits | 4 bits | 3 bits | 2 bits | x bits |

An invalid state or an invalid index of the TBS/MCS is used to indicate that a control channel is used for a control channel command

FIG. 4-b

CONTROL INFORMATION FORMAT PROCESSING METHOD, BASE STATION, AND USER EQUIPMENT

CROSS-REFERENCE TO RELATED APPLICATIONS

This application is a continuation of International Application No. PCT/CN2015/096227, filed on Dec. 3, 2015, the disclosure of which is hereby incorporated by reference in its entirety

TECHNICAL FIELD

Embodiments of the present disclosure relate to the field of communications technologies, and in particular, to a control information format processing method, a base station, and user equipment.

BACKGROUND

A control channel carries downlink control information. The downlink control information may be used to carry control channel command information. For example, the control channel command information may include one or more of a random access preamble index indication, a random access channel profile index indication, or a random access channel coverage enhancement level indication.

The downlink control information may further be used to carry grant information. The grant information carries control information required by user equipment to receive or send data. Downlink control information used to indicate downlink data transmission may be referred to as downlink grant. Downlink control information used to indicate uplink data transmission may be referred to as uplink grant.

In order not to increase control channel blind detections performed by user equipment (UE), a payload (payload) size (for example, a quantity of bits) of a control channel carrying grant information is usually the same as a payload size (for example, a quantity of bits) of the control channel carrying control channel command information. Therefore, it is necessary to differentiate whether downlink control information carries the grant information or the control channel command information for the UE.

In the prior art, when the downlink control information carries the control channel command information, there are usually many spare bits. The spare bits may be reserved bits or padding bits. The spare bits may also be difference bits between all bits included in a meaningful field when the downlink control information carries the grant information and all bits included in a meaningful field when the downlink control information carries the control channel command information. The meaningful field indicates that the field has a definite physical meaning in the downlink control information. The meaningful field is not a reserved bit, a padding bit, or a spare bit. Functions borne by the downlink control information can be differentiated by setting the spare bits to preset values. For example, if the downlink control information carries the control channel command information, there are 30 spare bits. A state of the 30 spare bits may be set to a fixed bit state. In this way, when the downlink control information carries the grant information, a bit state corresponding to the 30 spare bits in the downlink control information is not the foregoing fixed bit state. Because there are many spare bits, when the downlink control information carries the grant information, a base station is sufficiently capable of flexibly setting the bit state corresponding to the spare bits in the downlink control information to a state other than the fixed bit state. In this way, whether the downlink control information carries the grant information or the control channel command information can be differentiated according to the bit state corresponding to the spare bits.

However, in a coverage enhancement scenario, there are few bits in downlink control information. When the downlink control information carries the control channel command information, there are only a few spare bits (for example, only one spare bit). There is a high probability that functions borne by the downlink control information cannot be differentiated by setting the spare bits to preset values. For example, if the downlink control information carries the control channel command information, there is one spare bit. According to the prior art, a bit state corresponding to the one spare bit may be set to a fixed bit state. When the downlink control information carries the grant information, there is a high probability that the bit state corresponding to the one spare bit is the foregoing fixed bit state. As a result, a probability of falsely determining, by the user equipment, content borne by the control channel is increased. That is, in the coverage enhancement scenario, whether the downlink control information carries the grant information or the control channel command information cannot be differentiated according to the bit state corresponding to the spare bit.

SUMMARY

Embodiments of the present disclosure provide a control information format processing method, a base station, and user equipment, to effectively differentiate downlink control information in a coverage enhancement scenario.

According to a first aspect, an embodiment of the present disclosure provides a control information format processing method, including:

determining a control information format of downlink control information;

when the control information format of the downlink control information is a first control information format, determining that a first field included in the downlink control information corresponding to the first control information format indicates a valid setting; or when the control information format of the downlink control information is a second control information format, determining that a second field included in the downlink control information corresponding to the second control information format indicates an invalid setting; and sending the downlink control information corresponding to the determined control information format to user equipment UE.

With reference to the first aspect, in a first possible implementation of the first aspect, the valid setting includes: a valid bit state, or a valid first information index, or a valid combination of the first information index and second information; and the invalid setting includes: an invalid bit state, or an invalid first information index, or an invalid combination of the first information index and second information; where the valid bit state indicates valid first information or the valid first information index, the invalid bit state indicates invalid first information or the invalid first information index, and the first information index is used to indicate the first information.

With reference to the first aspect or the first possible implementation of the first aspect, in a second possible implementation of the first aspect, a bit location of the first field in the downlink control information corresponding to the first field is the same as a bit location of the second field in the downlink control information corresponding to the second field; or a bit location of more significant X bits of the first field in the downlink control information corresponding to the first field is the same as a bit location of the second field in the downlink control information corresponding to the second field, where X is a non-zero natural number; or a bit location of less significant X bits of the first field in the downlink control information corresponding to the first field is the same as a bit location of the second field in the downlink control information corresponding to the second field.

With reference to the first aspect, or the first or the second possible implementation of the first aspect, in a third possible implementation of the first aspect, the first field includes one or more of a transport block size field, a modulation and coding scheme field, a resource allocation within narrowband field, or a padding bit field, and the second field includes one or more of a transport block size field, a modulation and coding scheme field, a resource allocation within narrowband field, or a padding bit field; or the first field includes one or more of a transport block size field, a modulation and coding scheme field, a resource allocation within narrowband field, or a padding bit field, and the second field includes one or more of a grant differentiation field, a spare bit field, or a padding bit field.

With reference to the first, the second, or the third possible implementation of the first aspect, in a fourth possible implementation of the first aspect, the valid combination of the first information index and the second information includes:

the downlink control information is used for downlink data scheduling, the first information index includes an index number being a fixed value from 0 to 9, and the second information includes a value being a fixed value of 4 or 6; and/or the downlink control information is used for downlink data scheduling, the first information index includes an index number being 10, and the second information includes a value of 4; and/or the downlink control information is used for uplink data scheduling, the first information index includes an index number being a fixed value from 0 to 10, and the second information includes a value being a fixed value of 1 or 2;

the invalid combination of the first information index and the second information includes:

the first information index includes an index number being a fixed value of 10, 11, 12, 13, 14, or 15, and the second information includes a value of 6; and/or the downlink control information is used for downlink data scheduling, the first information index includes an index number being a fixed value from 0 to 15, and the second information includes a value being a fixed value of 1, 2, 3, or 5; and/or the downlink control information is used for uplink data scheduling, the first information index includes an index number being a fixed value from 0 to 15, and the second information includes a value being a fixed value of 3, 4, 5, or 6.

With reference to the first, the second, the third, or the fourth possible implementation of the first aspect, in a fifth possible implementation of the first aspect, the valid bit state includes a state value in all four-bit state values except 1011, 1100, 1101, 1110, and 1111; and/or the invalid bit state includes at least one state value of 1011, 1100, 1101, 1110, or 1111; and/or the valid first information index includes an index whose index number is one of 0, 1, 2, 3, 4, 5, 6, 7, 8, 9, or 10; and/or the invalid first information index includes an index whose index number is one of 11, 12, 13, 14, or 15.

With reference to the first, the second, the third, the fourth, or the fifth possible implementation of the first aspect, in a sixth possible implementation of the first aspect, the first information is a transport block size or a modulation and coding scheme; and/or the first information index is a transport block size index or a modulation and coding scheme index; and/or the second information is a quantity of resource blocks.

With reference to the first aspect, or the first, the second, the third, the fourth, the fifth, or the sixth possible implementation of the first aspect, in a seventh possible implementation of the first aspect, the downlink control information corresponding to the first control information format carries grant information; and/or the downlink control information corresponding to the second control information format carries control channel command information.

According to a second aspect, an embodiment of the present disclosure provides a control information format processing method, including:

detecting a first field included in downlink control information sent by a base station or a second field included in the downlink control information;

when it is determined that the first field included in the downlink control information indicates a valid setting, obtaining the downlink control information according to a first control information format; and when it is determined that the second field included in the downlink control information indicates an invalid setting, obtaining the downlink control information according to a second control information format.

With reference to the second aspect, in a first possible implementation of the second aspect, the valid setting includes: a valid bit state, or a valid first information index, or a valid combination of the first information index and second information; and the invalid setting includes: an invalid bit state, or an invalid first information index, or an invalid combination of the first information index and second information; where the valid bit state indicates valid first information or the valid first information index, the invalid bit state indicates invalid first information or the invalid first information index, and the first information index is used to indicate the first information.

With reference to the second aspect or the first possible implementation of the second aspect, in a second possible implementation of the second aspect, a bit location of the first field in the downlink control information corresponding to the first field is the same as a bit location of the second field in the downlink control information corresponding to the second field; or a bit location of more significant X bits of the first field in the downlink control information corresponding to the first field is the same as a bit location of the second field in the downlink control information corresponding to the second field, where X is a non-zero natural number; or a bit location of less significant X bits of the first field in the downlink control information corresponding to the first field is the same as a bit location of the second field in the downlink control information corresponding to the second field.

With reference to the second aspect, or the first or the second possible implementation of the second aspect, in a third possible implementation of the second aspect, the first field includes one or more of a transport block size field, a modulation and coding scheme field, a resource allocation within narrowband field, or a padding bit field, and the second field includes one or more of a transport block size field, a modulation and coding scheme field, a resource allocation within narrowband field, or a padding bit field; or the first field includes one or more of a transport block size field, a modulation and coding scheme field, a resource allocation within narrowband field, or a padding bit field, and the second field includes one or more of a grant differentiation field, a spare bit field, or a padding bit field.

With reference to the first, the second, or the third possible implementation of the second aspect, in a fourth possible implementation of the second aspect, the valid combination of the first information index and the second information includes:

the downlink control information is used for downlink data scheduling, the first information index includes an index number being a fixed value from 0 to 9, and the second information includes a value being a fixed value of 4 or 6; and/or the downlink control information is used for downlink data scheduling, the first information index includes an index number being 10, and the second information includes a value of 4; and/or the downlink control information is used for uplink data scheduling, the first information index includes an index number being a fixed value from 0 to 10, and the second information includes a value being a fixed value of 1 or 2;

the invalid combination of the first information index and the second information includes:

the first information index includes an index number being a fixed value of 10, 11, 12, 13, 14, or 15, and the second information includes a value of 6; and/or the downlink control information is used for downlink data scheduling, the first information index includes an index number being a fixed value from 0 to 15, and the second information includes a value being a fixed value of 1, 2, 3, or 5; and/or the downlink control information is used for uplink data scheduling, the first information index includes an index number being a fixed value from 0 to 15, and the second information includes a value being a fixed value of 3, 4, 5, or 6.

With reference to the first, the second, the third, or the fourth possible implementation of the second aspect, in a fifth possible implementation of the second aspect, the valid bit state includes a state value in all four-bit state values except 1011, 1100, 1101, 1110, and 1111; and/or the invalid bit state includes at least one state value of 1011, 1100, 1101, 1110, or 1111; and/or the valid first information index includes an index whose index number is one of 0, 1, 2, 3, 4, 5, 6, 7, 8, 9, or 10; and/or the invalid first information index includes an index whose index number is one of 11, 12, 13, 14, or 15.

With reference to the first, the second, the third, the fourth, or the fifth possible implementation of the second aspect, in a sixth possible implementation of the second aspect, the first information is a transport block size or a modulation and coding scheme; and/or the first information index is a transport block size index or a modulation and coding scheme index; and/or the second information is a quantity of resource blocks.

With reference to the second aspect, or the first, the second, the third, the fourth, the fifth, or the sixth possible implementation of the second aspect, in a seventh possible implementation of the second aspect, the downlink control information corresponding to the first control information format carries grant information; and/or the downlink control information corresponding to the second control information format carries control channel command information.

According to a third aspect, an embodiment of the present disclosure provides a base station, including:

an information format determining module, configured to determine a control information format of downlink control information;

a field setting determining module, configured to, when the control information format of the downlink control information is a first control information format, determine that a first field included in the downlink control information corresponding to the first control information format indicates a valid setting; or when the control information format of the downlink control information is a second control information format, determine that a second field included in the downlink control information corresponding to the second control information format indicates an invalid setting; and a transceiving module, configured to send the downlink control information corresponding to the determined control information format to user equipment UE.

With reference to the third aspect, in a first possible implementation of the third aspect, the valid setting determined by the field setting determining module includes: a valid bit state, or a valid first information index, or a valid combination of the first information index and second information; and the invalid setting determined by the field setting determining module includes: an invalid bit state, or an invalid first information index, or an invalid combination of the first information index and second information; where the valid bit state indicates valid first information or the valid first information index, the invalid bit state indicates invalid first information or the invalid first information index, and the first information index is used to indicate the first information.

With reference to the third aspect or the first possible implementation of the third aspect, in a second possible implementation of the third aspect, the field setting determining module is specifically configured to determine the following content:

a bit location of the first field in the downlink control information corresponding to the first field is the same as a bit location of the second field in the downlink control information corresponding to the second field; or a bit location of more significant X bits of the first field in the downlink control information corresponding to the first field is the same as a bit location of the second field in the downlink control information corresponding to the second field, where X is a non-zero natural number; or a bit location of less significant X bits of the first field in the downlink control information corresponding to the first field is the same as a bit location of the second field in the downlink control information corresponding to the second field.

With reference to the third aspect, or the first or the second possible implementation of the third aspect, in a third possible implementation of the third aspect, the field setting determining module is specifically configured to determine the following content:

the first field includes one or more of a transport block size field, a modulation and coding scheme field, a resource allocation within narrowband field, or a padding bit field, and the second field includes one or more of a transport block size field, a modulation and coding scheme field, a resource allocation within narrowband field, or a padding bit field; or the first field includes one or more of a transport block size field, a modulation and coding scheme field, a resource allocation within narrowband field, or a padding bit field, and the second field includes one or more of a grant differentiation field, a spare bit field, or a padding bit field.

With reference to the first, the second, or the third possible implementation of the third aspect, in a fourth possible implementation of the third aspect, the field setting determining module is specifically configured to determine that the valid combination of the first information index and the second information includes:

the downlink control information is used for downlink data scheduling, the first information index includes an index number being a fixed value from 0 to 9, and the second information includes a value being a fixed value of 4 or 6; and/or the downlink control information is used for downlink data scheduling, the first information index includes an index number being 10, and the second information includes a value of 4; and/or the downlink control information is used for uplink data scheduling, the first information index includes an index number being a fixed value from 0 to 10, and the second information includes a value being a fixed value of 1 or 2; and the field setting determining module is specifically configured to determine that the invalid combination of the first information index and the second information includes:

the first information index includes an index number being a fixed value of 10, 11, 12, 13, 14, or 15, and the second information includes a value of 6; and/or the downlink control information is used for downlink data scheduling, the first information index includes an index number being a fixed value from 0 to 15, and the second information includes a value being a fixed value of 1, 2, 3, or 5; and/or the downlink control information is used for uplink data scheduling, the first information index includes an index number being a fixed value from 0 to 15, and the second information includes a value being a fixed value of 3, 4, 5, or 6.

With reference to the first, the second, the third, or the fourth possible implementation of the third aspect, in a fifth possible implementation of the third aspect, the field setting determining module is specifically configured to determine that the valid bit state includes a state value in all four-bit state values except 1011, 1100, 1101, 1110, and 1111; and/or the field setting determining module is specifically configured to determine that the invalid bit state includes at least one state value of 1011, 1100, 1101, 1110, or 1111; and/or the field setting determining module is specifically configured to determine that the valid first information index includes an index whose index number is one of 0, 1, 2, 3, 4, 5, 6, 7, 8, 9, or 10; and/or the field setting determining module is specifically configured to determine that the invalid first information index includes an index whose index number is one of 11, 12, 13, 14, or 15.

With reference to the first, the second, the third, the fourth, or the fifth possible implementation of the third aspect, in a sixth possible implementation of the third aspect, the first information is a transport block size or a modulation and coding scheme; and/or the first information index is a transport block size index or a modulation and coding scheme index; and/or the second information is a quantity of resource blocks.

With reference to the third aspect, or the first, the second, the third, the fourth, the fifth, or the sixth possible implementation of the third aspect, in a seventh possible implementation of the third aspect, the downlink control information corresponding to the first control information format carries grant information; and/or the downlink control information corresponding to the second control information format carries control channel command information.

According to a fourth aspect, an embodiment of the present disclosure provides user equipment UE, including:

a detection module, configured to detect a first field included in downlink control information sent by a base station or a second field included in the downlink control information;

a first obtaining module, configured to obtain the downlink control information according to a first control information format when determining that the first field included in the downlink control information indicates a valid setting; and a second obtaining module, configured to obtain the downlink control information according to a second control information format when determining that the second field included in the downlink control information indicates an invalid setting.

With reference to the fourth aspect, in a first possible implementation of the fourth aspect, the valid setting determined by the first obtaining module includes: a valid bit state, or a valid first information index, or a valid combination of the first information index and second information; and the invalid setting specifically determined by the second obtaining module includes: an invalid bit state, or an invalid first information index, or an invalid combination of the first information index and second information; where the valid bit state indicates valid first information or the valid first information index, the invalid bit state indicates invalid first information or the invalid first information index, and the first information index is used to indicate the first information.

With reference to the fourth aspect or the first possible implementation of the fourth aspect, in a second possible implementation of the fourth aspect, the detection module is specifically configured to detect the following content:

a bit location of the first field in the downlink control information corresponding to the first field is the same as a bit location of the second field in the downlink control information corresponding to the second field; or a bit location of more significant X bits of the first field in the downlink control information corresponding to the first field is the same as a bit location of the second field in the downlink control information corresponding to the second field, where X is a non-zero natural number; or a bit location of less significant X bits of the first field in the downlink control information corresponding to the first field is the same as a bit location of the second field in the downlink control information corresponding to the second field.

With reference to the fourth aspect, or the first or the second possible implementation of the fourth aspect, in a third possible implementation of the fourth aspect, the detection module is specifically configured to detect the following content:

the first field includes one or more of a transport block size field, a modulation and coding scheme field, a resource allocation within narrowband field, or a padding bit field, and the second field includes one or more of a transport block size field, a modulation and coding scheme field, a resource allocation within narrowband field, or a padding bit field; or the first field includes one or more of a transport block size field, a modulation and coding scheme field, a resource allocation within narrowband field, or a padding bit field, and the second field includes one or more of a grant differentiation field, a spare bit field, or a padding bit field.

With reference to the first, the second, or the third possible implementation of the fourth aspect, in a fourth possible implementation of the fourth aspect, the first obtaining module is specifically configured to determine that the valid combination of the first information index and the second information includes:

the downlink control information is used for downlink data scheduling, the first information index includes an index number being a fixed value from 0 to 9, and the second information includes a value being a fixed value of 4 or 6; and/or the downlink control information is used for downlink data scheduling, the first information index includes an index number being 10, and the second information includes a value of 4; and/or the downlink control information is used for uplink data scheduling, the first information index includes an index number being a fixed value from 0 to 10, and the second information includes a value being a fixed value of 1 or 2;

the second obtaining module is specifically configured to determine that the invalid combination of the first information index and the second information includes:

the first information index includes an index number being a fixed value of 10, 11, 12, 13, 14, or 15, and the second information includes a value of 6; and/or the downlink control information is used for downlink data scheduling, the first information index includes an index number being a fixed value from 0 to 15, and the second information includes a value being a fixed value of 1, 2, 3, or 5; and/or the downlink control information is used for uplink data scheduling, the first information index includes an index number being a fixed value from 0 to 15, and the second information includes a value being a fixed value of 3, 4, 5, or 6.

With reference to the first, the second, the third, or the fourth possible implementation of the fourth aspect, in a fifth possible implementation of the fourth aspect, the first obtaining module is specifically configured to determine that the valid bit state includes a state value in all four-bit state values except 1011, 1100, 1101, 1110, and 1111; and/or the second obtaining module is specifically configured to determine that the invalid bit state includes at least one state value of 1011, 1100, 1101, 1110, or 1111; and/or the first obtaining module is specifically configured to determine that the valid first information index includes an index whose index number is one of 0, 1, 2, 3, 4, 5, 6, 7, 8, 9, or 10; and/or the second obtaining module is specifically configured to determine that the invalid first information index includes an index whose index number is one of 11, 12, 13, 14, or 15.

With reference to the first, the second, the third, the fourth, or the fifth possible implementation of the fourth aspect, in a sixth possible implementation of the fourth aspect, the first information is a transport block size or a modulation and coding scheme; and/or the first information index is a transport block size index or a modulation and coding scheme index; and/or the second information is a quantity of resource blocks.

With reference to the fourth aspect, or the first, the second, the third, the fourth, the fifth, or the sixth possible implementation of the fourth aspect, in a seventh possible implementation of the fourth aspect, the downlink control information corresponding to the first control information format carries grant information; and/or the downlink control information corresponding to the second control information format carries control channel command information.

It can be learned from the foregoing technical solutions that the embodiments of the present disclosure have the following advantages:

In the embodiments of the present disclosure, the control information format of the downlink control information is first determined. When the control information format of the downlink control information is the first control information format, it is determined that the first field included in the downlink control information corresponding to the first control information format indicates the valid setting. Alternatively, when the control information format of the downlink control information is the second control information format, it is determined that the second field included in the downlink control information corresponding to the second control information format indicates the invalid setting. The downlink control information corresponding to the determined control information format is finally sent to the UE. Whether the setting is valid may be indicated according to the control information format of the downlink control information by the first field or the second field included in the downlink control information. Therefore, the UE may determine, according to the first field or the second field included in the downlink control information, the control information format used by the base station, so that the UE may obtain the downlink control information according to the determined control information format. Because the first field and the second field indicate content of a fixed field carried in the downlink control information, using the control information format to indicate the content of the fixed field does not increase a payload size of the downlink control information, and can effectively differentiate the downlink control information in a coverage enhancement scenario.

BRIEF DESCRIPTION OF DRAWINGS

FIG. 3 is a schematic diagram of an application scenario of a control information format processing method according to an embodiment of the present disclosure;

FIG. 4-a is a schematic diagram of another application scenario of a control information format processing method according to an embodiment of the present disclosure;

FIG. 4-b is a schematic diagram of another application scenario of a control information format processing method according to an embodiment of the present disclosure;

DESCRIPTION OF EMBODIMENTS

The embodiments of the present disclosure provide a control information format processing method, a base station, and user equipment, to effectively differentiate downlink control information in a coverage enhancement scenario.

To make the disclosure objectives, features, and advantages of the present disclosure clearer and more comprehensible, the following clearly describes the technical solutions in the embodiments of the present disclosure with reference to the accompanying drawings in the embodiments of the present disclosure. Apparently, the embodiments described in the following are merely a part rather than all of the embodiments of the present disclosure. All other embodiments obtained by a person skilled in the art based on the embodiments of the present disclosure shall fall within the protection scope of the present disclosure.

In the specification, claims, and accompanying drawings of the present disclosure, the terms "first", "second", or the like are intended to differentiate between similar objects but do not necessarily indicate a specific order or sequence. It should be understood that the terms used in such a way are interchangeable in proper circumstances, which is merely a discrimination manner that is used when objects having a same attribute are described in the embodiments of the present disclosure. In addition, the terms "include", "contain", and any other variants mean to cover the non-exclusive inclusion, so that a process, method, system, product, or device that includes a series of units is not necessarily limited to those units, but may include other units not expressly listed or inherent to such a process, method, product, or device.

A system architecture to which a control information format processing method provided by the embodiments of the present disclosure is applied is first described. The control information format processing method provided by the embodiments of the present disclosure is applied to a base station side and a user equipment side. A base station sends downlink control information according to a determined control information format. UE needs to first detect the downlink control information sent by the base station to obtain the downlink control information. The following describes in detail the control information format processing method provided by the embodiments of the present disclosure from the perspective of the base station side and the user equipment side.

Figure 1:
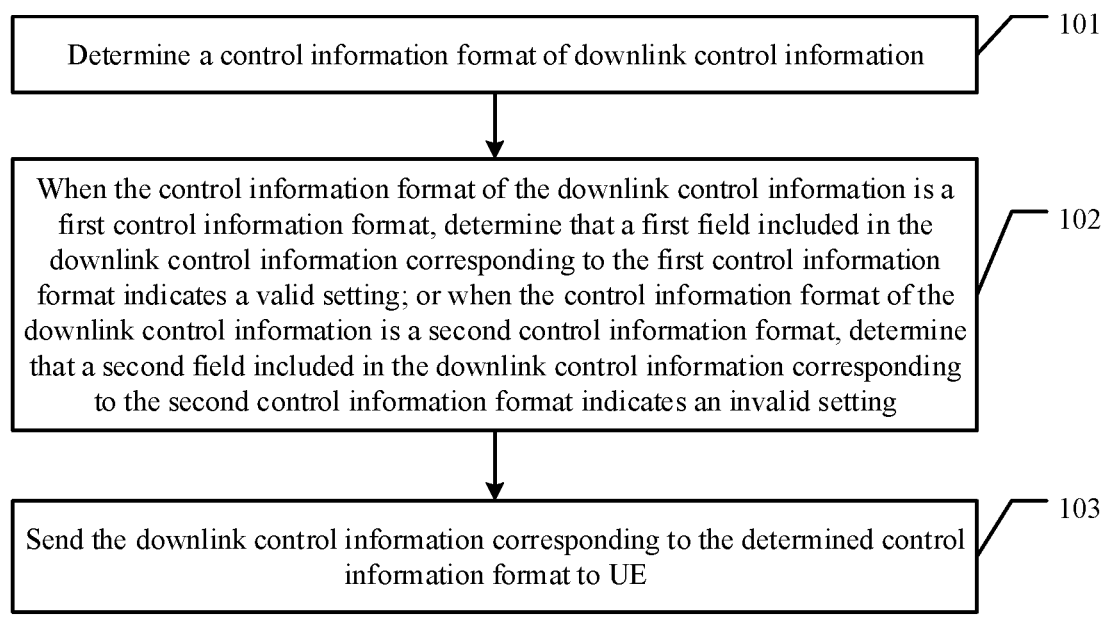
FIG. 1 is a schematic block diagram of a process of a control information format processing method according to an embodiment of the present disclosure.

Referring to FIG. 1, a control information format processing method provided by an embodiment of the present disclosure may include the following steps.

101: Determine a control information format of downlink control information.

In this embodiment of the present disclosure, a control channel carries downlink control information, and the downlink control information may be used to carry control information in a plurality of formats. Therefore, a base station needs to first determine a control information format of the downlink control information. Specifically, the base station may set a plurality of control information formats, and the control information formats set by the base station include: a first control information format and a second control information format. The first control information format and the second control information format indicate two different control information formats. In different specific scenarios, the first control information format and the second control information format may be used to indicate actual control information formats. In this embodiment of the present disclosure, the control information format of the downlink control information may not be limited to the first control information format and the second control information format, and may further include more control information formats. Methods for processing the more control information formats are similar to methods for processing the first control information format and the second control information format provided in this embodiment of the present disclosure, and reference may be made to processes of processing the first control information format and the second control information format described in the following embodiments.

In some embodiments of the present disclosure, the downlink control information corresponding to the first control information format carries grant information, and/or the downlink control information corresponding to the second control information format carries control channel command information. In this implementation scenario, the downlink control information may carry the grant information or the control channel command information. It is not limited that the downlink control information may further carry other control information, for example, may carry scheduling information of a paging message, and may further carry one or more of a system information update indication, an earthquake and typhoon warning, a commercial mobile access service, or extended access barring (EAB).

102: When the control information format of the downlink control information is a first control information format, determine that a first field included in the downlink control information corresponding to the first control information format indicates a valid setting; or when the control information format of the downlink control information is a second control information format, determine that a second field included in the downlink control information corresponding to the second control information format indicates an invalid setting.

In this embodiment of the present disclosure, the base station needs to first determine the control information format of the downlink control information in the step 101. The base station needs to use different control information format indication methods to determine different control information formats of the downlink control information, so that UE may determine, according to the different control information format indication methods determined by the base station, the different control information formats used by the base station. In this embodiment of the present disclosure, the base station may use a field included in the downlink control information to indicate a control information format. Specifically, the base station specifies whether a field included in the downlink control information indicates a valid setting to indicate the control information format used by the base station. Because the field included in the downlink control information is a part of content of the downlink control information that needs to be transmitted, a method of specifying whether the field included in the downlink control information indicates a valid setting is used by the base station to indicate the control information format. This method does not add an extra configuration field to the downlink control information, but only reuses the field included in the downlink control information. Therefore, a payload size of the downlink control information is not increased, and overheads of detecting the downlink control information by the UE are not increased.

In this embodiment of the present disclosure, for ease of description, the fields used to indicate the control information format in the downlink control information are defined as a first field and a second field. When the first field included in the downlink control information indicates the valid setting, it indicates that the base station uses the first control information format. When the second field included in the downlink control information indicates the invalid setting, it indicates that the base station uses the second control information format. The valid setting may refer to that field content included in the first field is valid, and the invalid setting refers to that field content included in the second field is invalid. Therefore, if the base station determines that the control information format of the downlink control information is the first control information format, the base station sets an indication of the first field included in the downlink control information to the valid setting, and the UE may determine, according to the indication, that is, the valid setting, of the first field included in the downlink control information, that the base station uses the first control information format. Similarly, if the base station determines that the control information format of the downlink control information is the second control information format, the base station sets an indication of the second field included in the downlink control information to the invalid setting, and the UE may determine, according to the indication, that is, the invalid setting, of the second field included in the downlink control information, that the base station uses the second control information format.

It should be noted that, in some embodiments of the present disclosure, the first field and the second field may be a same field or different fields. For example, the first field may include one or more of a transport block size field, a modulation and coding scheme field, a resource allocation within narrowband field, or a padding bit field, and the second field may include one or more of a transport block size field, a modulation and coding scheme field, a resource allocation within narrowband field, or a padding bit field. Alternatively, the first field may include one or more of a transport block size field, a modulation and coding scheme field, a resource allocation within narrowband field, or a padding bit field, and the second field may include one or more of a grant differentiation field, a spare bit field, or a padding bit field.

The transport block size field, the modulation and coding scheme field, the resource allocation within narrowband field, and the padding bit field are specific fields included in the downlink control information. One or more of the fields may be used as the first field and the second field in this embodiment of the present disclosure. In addition, the grant differentiation field and the spare bit field are also specific fields included in the downlink control information, and the second field may be implemented by using the grant differentiation field and the spare bit field.

In some embodiments of the present disclosure, the valid setting may include: a valid bit state, or a valid first information index, or a valid combination of the first information index and second information.

The invalid setting includes: an invalid bit state, or an invalid first information index, or an invalid combination of the first information index and second information.

The valid bit state indicates valid first information or the valid first information index, the invalid bit state indicates invalid first information or the invalid first information index, and the first information index is used to indicate the first information.

Specifically, in this embodiment of the present disclosure, the valid setting may be the valid bit state, the valid bit state may indicate the valid first information or the valid first information index, and the first information index may indicate the first information. That is, when determining to use the first control information format, the base station may set the indication of the first field to the valid bit state. The UE may learn, through the valid bit state, that the base station uses the first control information format. The valid setting may also be the valid first information index, that is, when determining to use the first control information format, the base station may set the indication of the first field to the valid first information index. The UE may learn, through the valid first information index, that the base station uses the first control information format. The valid setting may also be the valid combination of the first information index and the second information, that is, a combination of the first information index and the second information is valid. The second information may be information other than the first information. If the valid setting is the valid combination of the first information index and the second information, that is, when determining to use the first control information format, the base station may set the indication of the first field to the valid combination of the first information index and the second information. The UE may learn, through the valid combination of the first information index and the second information, that the base station uses the first control information format.

In this embodiment of the present disclosure, the invalid setting may be the invalid bit state, the invalid bit state may indicate the invalid first information or the invalid first information index, and the first information index may indicate the first information. That is, when determining to use the first control information format, the base station may set an indication of the second field to the invalid bit state. The UE may learn, through the invalid bit state, that the base station uses the first control information format. The invalid setting may also be the invalid first information index, that is, when determining to use the first control information format, the base station may set the indication of the second field to the invalid first information index. The UE may learn, through the invalid first information index, that the base station uses the first control information format. The invalid setting may also be the invalid combination of the first information index and the second information, that is, a combination of the first information index and the second information is invalid. The second information may be information other than the first information. If the invalid setting is the invalid combination of the first information index and the second information, that is, when determining to use the first control information format, the base station may set the indication of the second field to the invalid combination of the first information index and the second information. The UE may learn, through the invalid combination of the first information index and the second information, that the base station uses the first control information format.

Further, in other embodiments of the present disclosure, the first information is a transport block size or a modulation and coding scheme; and/or the first information index is a transport block size index or a modulation and coding scheme index; and/or the second information is a quantity of resource blocks. It should be noted that in an actual application scenario, the first information, the first information index, and the second information may further be implemented in another manner. Only a feasible implementation scenario in this embodiment of the present disclosure is provided herein.

In some embodiments of the present disclosure, the valid combination and the invalid combination are further described in the following. Specifically, the valid combination of the first information index and the second information may include:

the downlink control information is used for downlink data scheduling, the first information index includes an index number being a fixed value from 0 to 9, and the second information includes a value being a fixed value of 4 or 6; and/or the downlink control information is used for downlink data scheduling, the first information index includes an index number being 10, and the second information includes a value of 4; and/or the downlink control information is used for uplink data scheduling, the first information index includes an index number being a fixed value from 0 to 10, and the second information includes a value being a fixed value of 1 or 2.

The first information index includes an index number being a fixed value from 0 to 9, that is, the first information index may be an index number 0, an index number 1, an index number 2, an index number 3, an index number 4, an index number 5, an index number 6, an index number 7, an index number 8, or an index number 9. This is not limited herein. Specifically, a specific index number included in the first information index may be determined according to an application scenario.

Specifically, the invalid combination of the first information index and the second information may include:

the first information index includes an index number being a fixed value of 10, 11, 12, 13, 14, or 15, and the second information includes a value of 6; and/or the downlink control information is used for downlink data scheduling, the first information index includes an index number being a fixed value from 0 to 15, and the second information includes a value being a fixed value of 1, 2, 3, or 5; and/or the downlink control information is used for uplink data scheduling, the first information index includes an index number being a fixed value from 0 to 15, and the second information includes a value being a fixed value of 3, 4, 5, or 6.

In some embodiments of the present disclosure, the valid bit state and the invalid bit state are described by example in the following. Specifically, the valid bit state may include a state value in all four-bit state values except 1011, 1100, 1101, 1110, and 1111; and/or the invalid bit state may include at least one state value of 1011, 1100, 1101, 1110, or 1111; and/or the valid first information index may include an index whose index number is one of 0, 1, 2, 3, 4, 5, 6, 7, 8, 9, or 10; and/or the invalid first information index may include an index whose index number is one of 11, 12, 13, 14, or 15.

In some embodiments of the present disclosure, a bit location of the first field in the downlink control information corresponding to the first field is the same as a bit location of the second field in the downlink control information corresponding to the second field; or a bit location of more significant X bits of the first field in the downlink control information corresponding to the first field is the same as a bit location of the second field in the downlink control information corresponding to the second field, where X is a non-zero natural number; or a bit location of less significant X bits of the first field in the downlink control information corresponding to the first field is the same as a bit location of the second field in the downlink control information corresponding to the second field.

The bit location refers to a specific location of a field in the downlink control information. The bit location may be a relative location of a field to another field in the downlink control information, or may be a bit order of a field in the downlink control information. This is not specifically limited herein. In addition, the more significant X bits of the first field may refer to a total of X bits starting from the most significant bit in a top-to-bottom sequence in the first field. The less significant X bits of the first field may refer to a total of X bits starting from the least significant bit in a bottom-to-top sequence in the first field.

In some embodiments of the present disclosure, a quantity of bits in the first field is the same as a quantity of bits in the second field; or a quantity of more significant X bits in the first field is the same as a quantity of bits in the second field, where X is the quantity of bits in the second field; or a quantity of less significant X bits in the first field is the same as a quantity of bits in the second field, where X is the quantity of bits in the second field.

In other words, in this embodiment of the present disclosure, the first field may have a same field length as the second field, that is, the quantity of bits in the first field may be the same as the quantity of bits in the second field. In addition, the first field may alternatively have a greater field length than the second field, that is, the quantity of more significant X bits in the first field is the same as the quantity of bits in the second field, or the quantity of less significant X bits in the first field is the same as the quantity of bits in the second field.

103. Send the downlink control information corresponding to the determined control information format to UE.

In this embodiment of the present disclosure, according to descriptions of the step 102, after the base station sets the indication of the control information format in the downlink control information, the base station may send the downlink control information corresponding to the determined control information format to the UE. The base station may use the first control information format or the second control information format. It can be learned from the step 102 that, when the base station uses the first control information format and the second control information format, the base station separately performs different validity settings for the first field and the second field included in the downlink control information. The downlink control information sent by the base station to the UE includes information about the validity setting of the first field or the second field. The UE detects the downlink control information sent by the base station, and may determine, according to the information about the validity setting of the first field or the second field included in the downlink control information, whether the base station uses the first control information format or the second control information format. The UE may obtain, according to the determined control information format, the downlink control information sent by the base station.

It can be learned from descriptions of this embodiment of the present disclosure, the control information format of the downlink control information is first determined. When the control information format of the downlink control information is the first control information format, it is determined that the first field included in the downlink control information corresponding to the first control information format indicates the valid setting. Alternatively, when the control information format of the downlink control information is the second control information format, it is determined that the second field included in the downlink control information corresponding to the second control information format indicates the invalid setting. The downlink control information corresponding to the determined control information format is finally sent to the UE. Whether the setting is valid may be indicated according to the control information format of the downlink control information by the first field or the second field included in the downlink control information. Therefore, the UE may determine, according to the first field or the second field included in the downlink control information, the control information format used by the base station, so that the UE may obtain the downlink control information according to the determined control information format. Because the first field and the second field indicate content of a fixed field carried in the downlink control information, using the control information format to indicate the content of the fixed field does not increase a payload size of the downlink control information, and can effectively differentiate the downlink control information in a coverage enhancement scenario.

Figure 2:
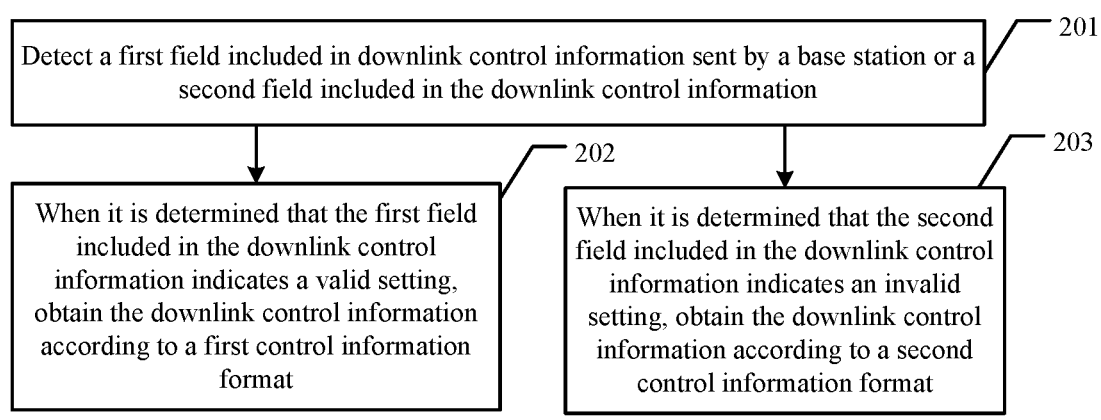
FIG. 2 is a schematic block diagram of a process of another control information format processing method according to an embodiment of the present disclosure.

The foregoing embodiment describes the control information format processing method provided by this embodiment of the present disclosure from the perspective of the base station side, and the following describes in detail a control information format processing method provided by an embodiment of the present disclosure from the perspective of a user equipment side. Referring to FIG. 2, the control information format processing method provided by this embodiment of the present disclosure may include the following steps.

201. Detect a first field included in downlink control information sent by a base station or a second field included in the downlink control information.

In this embodiment of the present disclosure, UE detects the downlink control information sent by the base station. The UE may determine a control information format by using a field included in the downlink control information. Specifically, the UE determines, according to whether the field included in the downlink control information indicates a valid setting, the control information format used by the base station. Because the field included in the downlink control information is a part of content of the downlink control information that needs to be transmitted, a method of specifying whether the field included in the downlink control information indicates a valid setting is used by the base station to indicate the control information format. This method does not add an extra configuration field to the downlink control information, but only reuses the field included in the downlink control information. Therefore, a payload size of the downlink control information is not increased, and overheads of detecting the downlink control information by the UE are not increased.

Specifically, the UE may detect the first field or the second field included in the downlink control information. In the foregoing embodiment, the base station configures information about whether the first field or the second field included in the downlink control information indicates the valid setting. The UE may detect the first field or the second field included in the downlink control information and determine whether an indication of the first field or the second field indicates the valid setting. If an indication result of the first field detected by the UE is different from an indication result of the second field, the UE may separately perform step 202 and step 203 that are described below.

In this embodiment of the present disclosure, when the downlink control information sent by the base station uses different control information formats, the UE also needs to use corresponding control information formats to receive the downlink control information. In this embodiment of the present disclosure, the UE may determine, according to whether the base station sets the indication of the first field or the second field included in the downlink control information to the valid setting, a manner of obtaining the downlink control information sent by the base station. The UE detects validity setting of the first field or the second field included in the downlink control information, and determines, according to whether the indication of the first field or the second field is the valid setting or an invalid setting, whether the base station uses a first control information format or a second control information format.

It should be noted that in different specific scenarios, the first control information format and the second control information format may be used to indicate actual control information formats. In this embodiment of the present disclosure, the control information format of the downlink control information may not be limited to the first control information format and the second control information format, and may further include more control information formats. Methods for processing the more control information formats are similar to methods for processing the first control information format and the second control information format provided in this embodiment of the present disclosure, and reference may be made to processes of processing the first control information format and the second control information format described in the following embodiments.

In some embodiments of the present disclosure, the downlink control information corresponding to the first control information format carries grant information, and/or the downlink control information corresponding to the second control information format carries control channel command information. In this implementation scenario, the downlink control information may carry the grant information or the control channel command information. This is different from a function borne by the downlink control information, and the downlink control information needs to use different control information formats. It is not limited that the downlink control information may further carry other control information, for example, may carry scheduling information of a paging message, and may further carry one or more of a system information update indication, an earthquake and typhoon warning, a commercial mobile access service, or extended access barring.

In some embodiments of the present disclosure, the first field and the second field may be a same field or different fields. For example, the first field may include one or more of a transport block size field, a modulation and coding scheme field, a resource allocation within narrowband field, or a padding bit field, and the second field may include one or more of a transport block size field, a modulation and coding scheme field, a resource allocation within narrowband field, or a padding bit field. Alternatively, the first field may include one or more of a transport block size field, a modulation and coding scheme field, a resource allocation within narrowband field, or a padding bit field, and the second field may include one or more of a grant differentiation field, a spare bit field, or a padding bit field.

The transport block size field, the modulation and coding scheme field, the resource allocation within narrowband field, and the padding bit field are specific fields included in the downlink control information. One or more of the fields may be used as the first field and the second field in this embodiment of the present disclosure. In addition, the grant differentiation field and the spare bit field are also specific fields included in the downlink control information, and the second field may be implemented by using the grant differentiation field and the spare bit field.

In some embodiments of the present disclosure, the valid setting may include: a valid bit state, or a valid first information index, or a valid combination of the first information index and second information.

The invalid setting includes: an invalid bit state, or an invalid first information index, or an invalid combination of the first information index and second information.

The valid bit state indicates valid first information or the valid first information index, the invalid bit state indicates invalid first information or the invalid first information index, and the first information index is used to indicate the first information.

Specifically, in this embodiment of the present disclosure, the valid setting may be the valid bit state, the valid bit state may indicate the valid first information or the valid first information index, and the first information index may indicate the first information. That is, when determining to use the first control information format, the base station may set the indication of the first field to the valid bit state. The UE may learn, through the valid bit state, that the base station uses the first control information format. The valid setting may also be the valid first information index, that is, when determining to use the first control information format, the base station may set the indication of the first field to the valid first information index. The UE may learn, through the valid first information index, that the base station uses the first control information format. The valid setting may also be the valid combination of the first information index and the second information, that is, a combination of the first information index and the second information is valid. The second information may be information other than the first information. If the valid setting is the valid combination of the first information index and the second information, that is, when determining to use the first control information format, the base station may set the indication of the first field to the valid combination of the first information index and the second information. The UE may learn, through the valid combination of the first information index and the second information, that the base station uses the first control information format.

In this embodiment of the present disclosure, the invalid setting may be the invalid bit state, the invalid bit state may indicate the invalid first information or the invalid first information index, and the first information index may indicate the first information. That is, when determining to use the first control information format, the base station may set an indication of the second field to the invalid bit state. The UE may learn, through the invalid bit state, that the base station uses the first control information format. The invalid setting may also be the invalid first information index, that is, when determining to use the first control information format, the base station may set the indication of the second field to the invalid first information index. The UE may learn, through the invalid first information index, that the base station uses the first control information format. The invalid setting may also be the invalid combination of the first information index and the second information, that is, a combination of the first information index and the second information is invalid. The second information may be information other than the first information. If the invalid setting is the invalid combination of the first information index and the second information, that is, when determining to use the first control information format, the base station may set the indication of the second field to the invalid combination of the first information index and the second information. The UE may learn, through the invalid combination of the first information index and the second information, that the base station uses the first control information format.

Further, in other embodiments of the present disclosure, the first information is a transport block size or a modulation and coding scheme; and/or the first information index is a transport block size index or a modulation and coding scheme index. The second information is a quantity of resource blocks. It should be noted that in an actual application scenario, the first information, the first information index, and the second information may further be implemented in another manner. Only a feasible implementation scenario in this embodiment of the present disclosure is provided herein.

In some embodiments of the present disclosure, the valid combination and the invalid combination are further described in the following. Specifically, the valid combination of the first information index and the second information may include:

the downlink control information is used for downlink data scheduling, the first information index includes an index number being a fixed value from 0 to 9, and the second information includes a value being a fixed value of 4 or 6; and/or the downlink control information is used for downlink data scheduling, the first information index includes an index number being 10, and the second information includes a value of 4; and/or the downlink control information is used for uplink data scheduling, the first information index includes an index number being a fixed value from 0 to 10, and the second information includes a value being a fixed value of 1 or 2.

The first information index includes an index number being a fixed value from 0 to 9, that is, the first information index may be an index number 0, an index number 1, an index number 2, an index number 3, an index number 4, an index number 5, an index number 6, an index number 7, an index number 8, or an index number 9. This is not limited herein. Specifically, a specific index number included in the first information index may be determined according to an application scenario.

Specifically, the invalid combination of the first information index and the second information may include:

the first information index includes an index number being a fixed value of 10, 11, 12, 13, 14, or 15, and the second information includes a value of 6; and/or the downlink control information is used for downlink data scheduling, the first information index includes an index number being a fixed value from 0 to 15, and the second information includes a value being a fixed value of 1, 2, 3, or 5; and/or the downlink control information is used for uplink data scheduling, the first information index includes an index number being a fixed value from 0 to 15, and the second information includes a value being a fixed value of 3, 4, 5, or 6.

In some embodiments of the present disclosure, the valid bit state and the invalid bit state are described by example in the following. Specifically, the valid bit state may include a state value in all four-bit state values except 1011, 1100, 1101, 1110, and 1111; and/or the invalid bit state may include at least one state value of 1011, 1100, 1101, 1110, or 1111; and/or the valid first information index may include an index whose index number is one of 0, 1, 2, 3, 4, 5, 6, 7, 8, 9, or 10; and/or the invalid first information index may include an index whose index number is one of 11, 12, 13, 14, or 15.

In some embodiments of the present disclosure, a bit location of the first field in the downlink control information corresponding to the first field is the same as a bit location of the second field in the downlink control information corresponding to the second field; or a bit location of more significant X bits of the first field in the downlink control information corresponding to the first field is the same as a bit location of the second field in the downlink control information corresponding to the second field, where X is a non-zero natural number; or a bit location of less significant X bits of the first field in the downlink control information corresponding to the first field is the same as a bit location of the second field in the downlink control information corresponding to the second field.

The bit location refers to a specific location of a field in the downlink control information. The bit location may be a relative location of a field to another field in the downlink control information, or may be a location number of a field in the downlink control information. This is not specifically limited herein. In addition, the more significant X bits of the first field may refer to a total of X bits starting from the most significant bit in a top-to-bottom sequence in the first field. The less significant X bits of the first field may refer to a total of X bits starting from the least significant bit in a bottom-to-top sequence in the first field.

In some embodiments of the present disclosure, a quantity of bits in the first field is the same as a quantity of bits in the second field; or a quantity of more significant X bits in the first field is the same as a quantity of bits in the second field, where X is the quantity of bits in the second field; or a quantity of less significant X bits in the first field is the same as a quantity of bits in the second field, where X is the quantity of bits in the second field.

In other words, in this embodiment of the present disclosure, the first field may have a same field length as the second field, that is, the quantity of bits in the first field may be the same as the quantity of bits in the second field. In addition, the first field may alternatively have a greater field length than the second field, that is, the quantity of more significant X bits in the first field is the same as the quantity of bits in the second field, or the quantity of less significant X bits in the first field is the same as the quantity of bits in the second field.

202. When it is determined that the first field included in the downlink control information indicates a valid setting, obtain the downlink control information according to a first control information format.

In this embodiment of the present disclosure, the UE may detect the first field included in the downlink control information. If determining that the first field indicates the valid setting, the UE may determine that the base station uses the first control information format, and the UE may obtain the downlink control information according to the first control information format.

203. When it is determined that the second field included in the downlink control information indicates an invalid setting, obtain the downlink control information according to a second control information format.

In this embodiment of the present disclosure, the UE may detect the second field included in the downlink control information. If determining that the second field indicates the invalid setting, the UE may determine that the base station uses the second control information format, and the UE may obtain the downlink control information according to the second control information format.

It can be learned from descriptions of this embodiment of the present disclosure, the UE first detects the first field or the second field included in the downlink control information sent by the base station. When determining that the first field included in the downlink control information indicates the valid setting, the UE obtains the downlink control information according to the first control information format. When determining that the second field included in the downlink control information indicates the invalid setting, the UE obtains the downlink control information according to the second control information format. Whether the setting is valid may be indicated according to the control information format of the downlink control information by the first field or the second field included in the downlink control information. Therefore, the UE may determine, according to the first field or the second field included in the downlink control information, the control information format used by the base station, so that the UE may obtain the downlink control information according to the determined control information format. Because the first field and the second field indicate content of a fixed field carried in the downlink control information, using the control information format to indicate the content of the fixed field does not increase a payload size of the downlink control information, and can effectively differentiate the downlink control information in a coverage enhancement scenario.

To better understand and implement the foregoing solutions in the embodiments of the present disclosure, the following uses a corresponding application scenario as an example for specific descriptions.

In this embodiment of the present disclosure, a method for effectively differentiating whether the downlink control information carries the grant information or the control channel command information is provided for a coverage enhancement scenario.

Referring to FIG. 3, FIG. 3 is a schematic diagram of a composition structure of the downlink control information when the downlink control information carries the grant information and when the downlink control information carries a control information command in this embodiment of the present disclosure. When the downlink control information carries the grant information, the grant information includes content of at least one of the following fields: grant differentiation indication, narrowband index indication, resource allocation within narrowband indication, and transport block size (TBS) indication, or modulation and coding scheme (MCS) indication, repetition number indication, hybrid automatic repeat request process number indication, new data indicator, hybrid automatic repeat request acknowledgment resource offset indication, downlink control information repetition number indication, and padding bits. The following describes each field included in the grant information.

The grant differentiation indication is first described, and the grant differentiation indication is used to indicate whether grant is uplink grant or downlink grant. The narrowband index indication is used to indicate an index number used by a narrowband. For example, ceil (log 2 (floor ($N_{DL}RB/6$))) bits are used to indicate a narrowband index number, where ceil indicates a round-up function, floor indicates a round-down function, and $N_{DL}RB$ indicates a quantity of resource blocks (RB) included in a downlink system bandwidth. For example, the system bandwidths are as follows: 1.4 MHz (Mega Hertz, MHz for short), 3 MHz, 5 MHz, 10 MHz, 15 MHz, and 20 MHz, and quantities of resource blocks included in $N_{DL}RB$ are 6, 15, 25, 50, 75, and 100. A quantity of bits required by the narrowband index indication is described as follows by example.

When the system bandwidth=1.4 MHz, there is a total of 1 narrowband, and 0 bit indicates a narrowband index.

When the system bandwidth=3 MHz, there are a total of 2 narrowbands, and 1 bit indicates a narrowband index.

When the system bandwidth=5 MHz, there are a total of 4 narrowbands, and 2 bits indicate a narrowband index.

When the system bandwidth=10 MHz, there are a total of 8 narrowbands, and 3 bits indicate a narrowband index.

When the system bandwidth=15 MHz, there are a total of 12 narrowbands, and 4 bits indicate a narrowband index.

When the system bandwidth=20 MHz, there are a total of 16 narrowbands, and 4 bits indicate a narrowband index.

The resource allocation within narrowband indication is described. For example, if one narrowband includes six resource blocks: {PRBn, PRBn+1, PRBn+2, PRBn+3, PRBn+4, PRBn+5}. There are two methods for allocating resources within narrowband: allocating the six resource blocks {PRBn, PRBn+1, PRBn+2, PRBn+3, PRBn+4, PRBn+5} to user equipment, or allocating four resource blocks {PRBn, PRBn+1, PRBn+2, PRBn+3} to user equipment. In this case, one bit needs to indicate resource allocation within narrowband. Certainly, resource indication within narrowband may also be performed by using 5, 4, or 3 bits.

The TBS indication or MCS indication is described. For example, 4 bits are used to indicate a TBS index or an MCS index. Referring to Table 1, Table 1 is a configuration relationship table between TBS indexes and quantities of resource blocks. When 4 bits are used to indicate a TBS index, a TBS may be obtained according to an indicated TBS index and a quantity of resource blocks in the table. When 4 bits are used to indicate a TBS index or an MCS index, because there are 11 TBS indexes in total in Table 1, there are still 5 unused states. For example, it may be assumed that the 5 unused states (the leftmost bits are the most significant bits) are: 1011, 1100, 1101, 1110, 1111.

TABLE 1

Determining a TBS according to a TBS index and a quantity of resource blocks

| TBS index | Resource block quantity | | | | | |
|---|---|---|---|---|---|---|
| | 1 | 2 | 3 | 4 | 5 | 6 |
| 0 | 16 | 32 | 56 | 88 | 120 | 152 |
| 1 | 24 | 56 | 88 | 144 | 176 | 208 |
| 2 | 32 | 72 | 144 | 176 | 208 | 256 |
| 3 | 40 | 104 | 176 | 208 | 256 | 328 |
| 4 | 56 | 120 | 208 | 256 | 328 | 408 |
| 5 | 72 | 144 | 224 | 328 | 424 | 504 |
| 6 | 328 | 176 | 256 | 392 | 504 | 600 |
| 7 | 104 | 224 | 328 | 472 | 584 | 712 |
| 8 | 120 | 256 | 392 | 536 | 680 | 808 |
| 9 | 136 | 296 | 456 | 616 | 776 | 936 |
| 10 | 144 | 328 | 504 | 680 | 872 | Unavailable |

In addition, in this embodiment of the present disclosure, the repetition number indication may be 3 bits, the hybrid automatic repeat request process number indication may be 1 bit, the new data indicator may be 1 bit, the hybrid automatic repeat request acknowledgment resource offset indication may be 2 bits, and the downlink control information repetition number indication may be 2 bits. In addition, if the grant information further includes padding bits, the padding bits are x bits, where x is a natural number that may be set according to a requirement.

When the downlink control information includes the grant information, states of some fields in the downlink control information are set to fixed values to grant scheduling of some messages. For example, to grant scheduling of a random access response message, bit states of a hybrid automatic repeat request process number indication and a new data indicator are preset fixed values (for example, 1 or 0).

It should be noted that, when a quantity x of padding bits is not equal to 0, the grant information further includes padding bits. x is a predefined number. When the quantity of padding bits is equal to 0, the grant information does not include padding bits.

When the downlink control information carries the control channel command information, the control channel command information includes content of at least one of the following fields: grant differentiation indication, narrowband index indication, resource allocation within narrowband indication, random access preamble index indication, random access channel profile index indication, random access channel coverage enhancement level indication, and padding bits.

A definition and a size of each field of the grant differentiation indication, the narrowband index indication, the resource allocation within narrowband indication, and the padding bits included in the control channel command information are the same as a definition and a size of each field of the grant differentiation indication, the narrowband index indication, the resource allocation within narrowband indication, and the padding bits included in the grant information.

For the random access preamble index indication, a random access preamble index may be a preamble index that may be indicated by A bits, where A is a predefined positive integer. For example, A is equal to 6, 5, 4, 3, or 2.

For the random access channel profile index indication, a random access channel profile index may be a physical random access channel (PRACH) mask index that may be indicated by B bits, where B is a predefined positive integer. For example, B is equal to 4, 3, 2, 5, or 6.

For the random access channel coverage enhancement level indication, a random access channel coverage enhancement level may be indicated by C bits, where C is a predefined positive integer. For example, C is equal to 2, 1, 3, or 4.

In this embodiment of the present disclosure, the TBS index (or the MCS index) may be a valid or invalid index, and the TBS index may be used to indicate whether the downlink control channel carries the grant information or the control channel command information.

When downlink control information of a downlink control channel carries control channel command information, the downlink control information of the downlink control channel further includes a field indicating a TBS index (or an MCS index). When the downlink control information carries the control channel command information, a bit size of the field indicating the TBS index (or the MCS index) in the downlink control information is the same as a bit size of a field indicating a TBS index (or an MCS index) in grant information when the downlink control channel carries the grant information.

Referring to FIG. 4-a, FIG. 4-a is a schematic diagram of another composition structure of the downlink control information when the downlink control information carries the grant information and when the downlink control information carries a control information command in this embodiment of the present disclosure. For example, a quantity of bits indicating a preamble index may be decreased, and saved bits are used to indicate a TBS index (or an MCS index). For example, originally 6 bits indicate the preamble index, and the 6 bits may be changed to 3 bits to indicate the preamble index. Therefore, the saved 3 bits may be used to indicate the TBS index (or the MCS index). If 4 bits indicate a field of the TBS index (or the MCS index) in the grant information, in the downlink control information that carries the control channel command information, the saved 3 bits and 1 particular bit (for example, the particular bit may be a spare bit) may constitute 4 bits, and the 4 bits are used to indicate the TBS index (or the MCS index) in the downlink control information that carries the control channel command information. The 1 particular bit may be a bit differentiating uplink grant from downlink grant, a spare bit, a padding bit, another predefined bit, or a newly added bit. In FIG. 4-a, a valid state or a valid index of the TBS/MCS is used to indicate that the control channel is used for the grant information, and an invalid state or an invalid index of the TBS/MCS is used to indicate that the control channel is used for the control channel command information.

Referring to FIG. 4-b, FIG. 4-b is a schematic diagram of another composition structure of the downlink control information when the downlink control information carries the grant information and when the downlink control information carries a control information command in this embodiment of the present disclosure. For example, a quantity of bits indicating a preamble index and a quantity of bits indicating a PRACH mask index may be decreased, and saved bits are used to indicate a TBS index (or an MCS index). For example, originally 6 bits indicate the preamble index, and the 6 bits are changed to 4 bits to indicate the preamble index. For example, originally 4 bits indicate the PRACH mask index, and the 4 bits are changed to 3 bits to indicate the PRACH mask index. Therefore, the saved 3 bits may be used to indicate the TBS index (or the MCS index). If 4 bits indicate a field of the TBS index (or the MCS index) in the grant information, in the downlink control information that carries the control channel command information, the saved 3 bits and 1 particular bit may constitute 4 bits, and the 4 bits are used to indicate the TBS index (or the MCS index) in the downlink control information that carries the control channel command information. The particular bit may be a bit differentiating uplink grant from downlink grant, a spare bit, a padding bit, another predefined bit, or a newly added bit. In FIG. 4-b, a valid state or a valid index of the TBS/MCS is used to indicate that the control channel is used for the grant information, and an invalid state or an invalid index of the TBS/MCS is used to indicate that the control channel is used for the control channel command information.

Certainly and alternatively, a quantity of bits of another field may be decreased, so that a saved bit and/or a particular bit is used to indicate the TBS index (or the MCS index). Where applicable, any manner may be used to ensure that a bit size of the saved bit and/or the particular bit in the downlink control information that carries the control channel command information is the same as a bit size of the field indicating the TBS index (or the MCS index) in the grant information.

To differentiate whether the downlink control information carries the control channel command information or the grant information, the TBS index (or the MCS index) indicated in the downlink control information that carries the control channel command information needs to be an invalid TBS index (or MCS index), and the TBS index (or the MCS index) indicated in the downlink control information that carries the grant information is a valid TBS index (or MCS index). The invalid TBS index (or MCS index) refers to that the TBS index (or the MCS index) cannot indicate a valid TBS (or MCS). For example, as described above, when a state of the 4 bits indicating the TBS index (or the MCS index) is any one of the following states, the TBS index (or the MCS index) indicated by the 4 bits is an invalid index. Otherwise, when the state of the 4 bits indicating the TBS index (or the MCS index) is not any one of the following states, the TBS index (or the MCS index) indicated by the 4 bits is a valid index. The 4 bits may be one of the following five pieces of information: 1011, 1100, 1101, 1110, or 1111.

In this embodiment of the present disclosure, a manner of using the valid TBS index (or MCS index) or the invalid TBS index (or MCS index) indicated in the downlink control information to differentiate an information type carried in the downlink control information may be applied to differentiating other different information types carried in the downlink control information. If the downlink control information has different information types (or information formats), a manner of using a valid index (or a valid state) or an invalid index (or an invalid state) may be used to differentiate the information types (or information formats) carried in the downlink control information. For example, the downlink control information may carry scheduling information of a paging message, and the downlink control information may further carry one or more of a system information update indication, an earthquake and typhoon warning, a commercial mobile access service, or extended access barring.

According to the method in this embodiment, complexity of control channel blind detection by UE can be avoided, and power consumption of the UE can be reduced.

It should be noted that, in the method described in this embodiment of the present disclosure, an order of the fields included in the downlink control information may be changed. The schematic diagram of the information composition structure in the present disclosure is only an example. When the downlink control information carries the control channel command information, the invalid TBS index (or MCS index) is indicated. When the downlink control information carries the control channel command information and when the downlink control information carries the grant information, the valid TBS index (or MCS index) is indicated.

The following describes other embodiments of the present disclosure. To differentiate whether downlink control information carries control channel command information or grant information, an invalid TBS index (or MCS index) or a valid TBS index (or MCS index) may be indicated in the downlink control information. When the invalid TBS index (or MCS index) is indicated in the downlink control information, the downlink control information carries the control channel command information. When the valid TBS index (or MCS index) is indicated in the downlink control information, the downlink control information carries the grant information.

As described above, when a state of 4 bits indicating a TBS index (or an MCS index) is any one of the following states, the TBS index (or the MCS index) indicated by the 4 bits is an invalid index, for example, 1011, 1100, 1101, 1110, or 1111.

It should be noted that the base station only needs to enable the user equipment to learn an invalid TBS index (or MCS index), and does not need to enable the user equipment to learn a specific bit state corresponding to the invalid TBS index (or MCS index). The last four field states of the five invalid field states have a common characteristic: The most significant 2 bits are 11. When the most significant 2 bits used to indicate the field of the TBS index (or the MCS index) are 11, it is impossible to indicate a valid TBS index (or MCS index). Therefore, if the UE learns that the most significant 2 bits used to indicate the field of the TBS index (or the MCS index) are 11, the UE learns that the downlink control information carries the control channel command information. Otherwise, if the UE learns that the most significant 2 bits used to indicate the field of the TBS index (or the MCS index) are not 11, the UE learns that the downlink control information carries the grant information.

Figure 5:
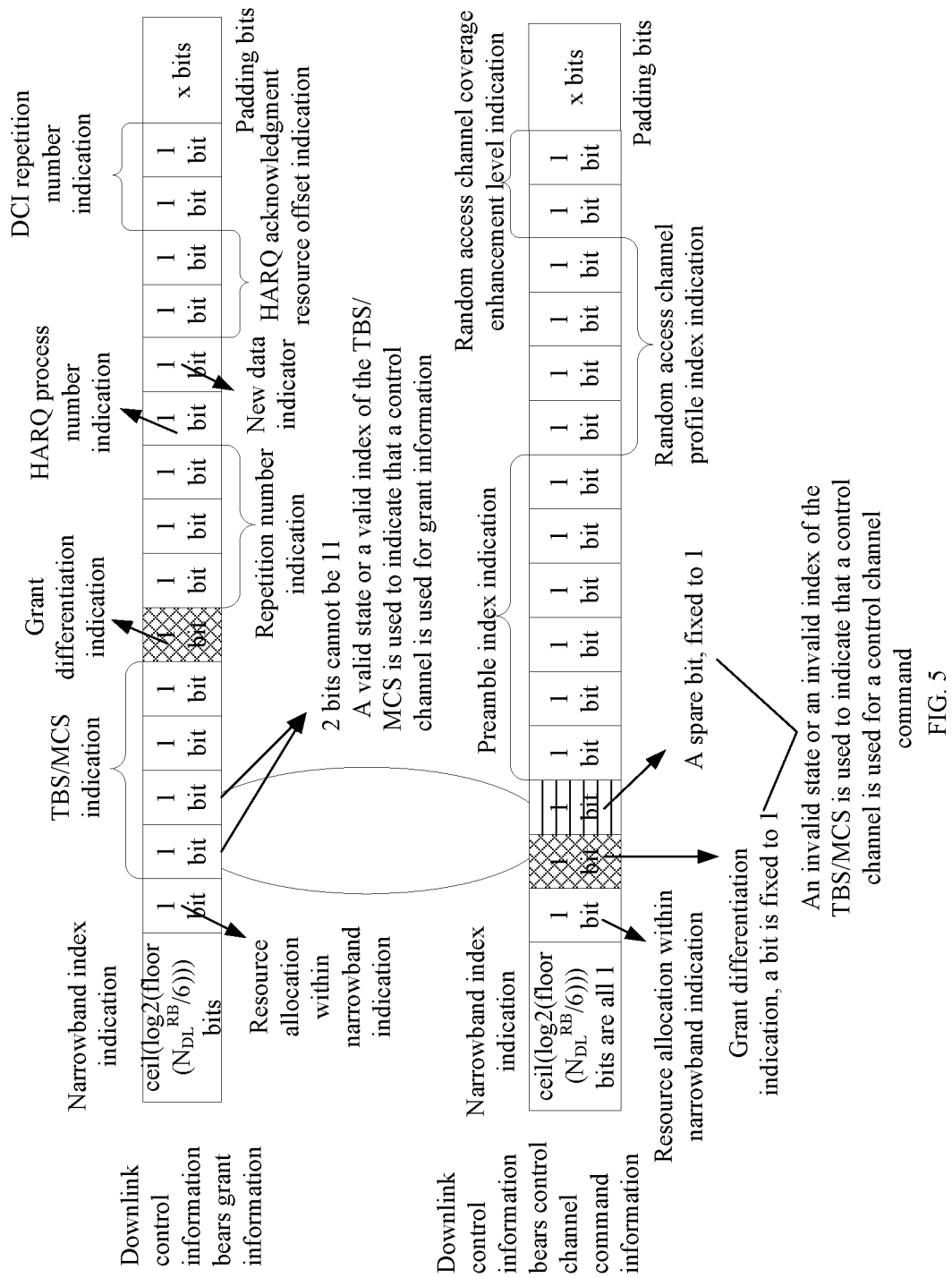
FIG. 5 is a schematic diagram of another application scenario of a control information format processing method according to an embodiment of the present disclosure.

As shown in FIG. 5, when the downlink control information carries the control channel command information, a state of 2 bits needs to be set to 11, and a location of the 2 bits in the downlink control information is corresponding to the most significant 2 bits used to indicate the field of the TBS index (or the MCS index) when the downlink control information carries the grant information. For example, a second field indicates an invalid setting, and the second field includes a grant differentiation indication and a spare bit. The grant differentiation indication includes 1 bit, and a value of the bit is fixed to 1. The spare bit includes 1 bit, and a value of the bit is fixed to 1. The invalid state or the invalid index of the TBS/MCS is used to indicate that the control channel is used for a control channel command. When the downlink control information carries the grant information, a bit value of the most significant 2 bits indicating the TBS/MCS cannot be 11, and the valid state or the valid index of the TBS/MCS is used to indicate that the control channel is used for the grant information.

After detecting the downlink control information, the UE determines a bit state corresponding to the bit location of the most significant 2 bits used to indicate the field of the TBS index (or the MCS index) in the downlink control information. If the bit state is 11, the UE considers that the downlink control information carries the control channel command information. If the bit state is not 11, the UE considers that the downlink control information carries the grant information.

For the base station side, if the downlink control information sent by the base station carries the control channel command information, the bit state corresponding to the bit location of the most significant 2 bits used to indicate the field of the TBS index (or the MCS index) in the downlink control information is set to 11. If the downlink control information sent by the base station carries the grant information, the bit state corresponding to the bit location of the most significant 2 bits used to indicate the field of the TBS index (or the MCS index) in the downlink control information is not set to 11.

It should be noted that, when the downlink control information carries the grant information, a bit location, of the grant differentiation indication field, in the downlink control information is a predefined fixed bit location. However, the bit location, of the grant differentiation indication field, in the downlink control information when the downlink control information carries the grant information is different from a bit location, of the grant differentiation indication field, in the downlink control information when the downlink control information carries the control channel command information.

In this embodiment of the present disclosure, a bit size of any field in the downlink control information does not need to be decreased, and the grant differentiation indication field and/or the spare bit is used to indicate an invalid TBS index (or MCS index).

It should be noted that, in the method described in this embodiment of the present disclosure, an order of the fields included in the downlink control information may be changed. The schematic diagram in this embodiment of the present disclosure is only an example. However, a bit location, of the grant differentiation indication field and/or the spare bit, in the downlink control information when the downlink control information carries the control channel command information is the same as a bit location, of more significant (or less significant) Y bits used to indicate the field of the TBS index (or the MCS index), in the downlink control information when the downlink control information carries the grant information. Y is a quantity of bits included in the grant differentiation indication field and/or the spare bit.

In this embodiment of the present disclosure, to differentiate whether the downlink control information carries the control channel command information or the grant information, an invalid TBS (or MCS) or a valid TBS (or MCS) may be indicated in the downlink control information. When the invalid TBS (or MCS) is indicated in the downlink control information, the downlink control information carries the control channel command information. When the valid TBS (or MCS) is indicated in the downlink control information, the downlink control information carries the grant information.

For example, as shown in Table 1, when a TBS index (or an MCS index) is 10 and a quantity of allocated resource blocks is 6, a TBS indicated by the TBS index (or the MCS index) does not exist or is unavailable. Therefore, the TBS index (or the MCS index) being 10 and the quantity of allocated resource blocks being 6 may be used to indicate that the downlink control information carries the control channel command information. When the TBS index (or the MCS index) indicated by the base station is an index value ranging from 0 to 9 and the quantity of allocated resource blocks is a value ranging from 1 to 6, the downlink control information carries the grant information. Alternatively, when the TBS index (or the MCS index) indicated by the base station is 10 and the quantity of allocated resource blocks is a value ranging from 1 to 5, the downlink control information carries the grant information.

For another example, if the grant differentiation field indicates uplink grant, but a quantity of resource blocks after resource allocation is a value ranging from 3 to 6, the downlink control information carries the control channel command information. For another example, if the grant differentiation field indicates uplink grant, but a quantity of resource blocks after resource allocation is a value ranging from 1 to 2, the downlink control information carries the grant information.

For another example, if the grant differentiation field indicates downlink grant, but a quantity of resource blocks after resource allocation is a value of 1, 2, 3, or 5, the downlink control information carries the control channel command information. For another example, if the grant differentiation field indicates downlink grant, but a quantity of resource blocks after resource allocation is a value of 4 or 6, the downlink control information carries the grant information.

It should be noted that, for brief description, the foregoing method embodiments are represented as a series of actions. However, a person skilled in the art should appreciate that the present disclosure is not limited to the described order of the actions, because according to the present disclosure, some steps may be performed in other orders or simultaneously. In addition, a person skilled in the art should also understand that the embodiments described in this specification all belong to embodiments, and the actions and modules are not necessarily mandatory to the present disclosure.

To better implement the foregoing solutions in the embodiments of the present disclosure, the following further provides a related apparatus for implementing the foregoing solutions.

Figure 6:
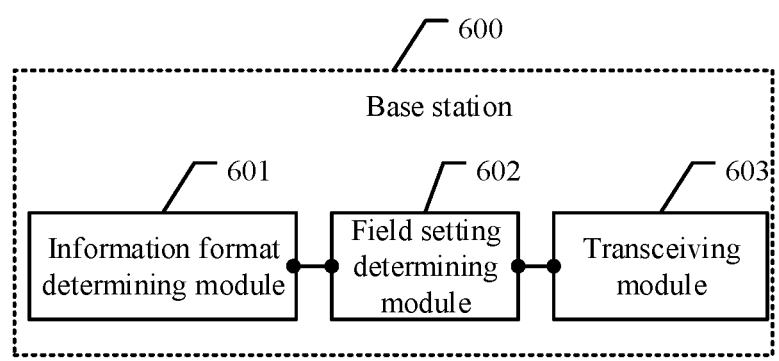
FIG. 6 is a schematic diagram of a composition structure of a base station according to an embodiment of the present disclosure.

Referring to FIG. 6, a base station 600 provided by an embodiment of the present disclosure may include: an information format determining module 601, a field setting determining module 602, and a transceiving module 603.

The information format determining module 601 is configured to determine a control information format of downlink control information.

The field setting determining module 602 is configured to, when the control information format of the downlink control information is a first control information format, determine that a first field included in the downlink control information corresponding to the first control information format indicates a valid setting; or when the control information format of the downlink control information is a second control information format, determine that a second field included in the downlink control information corresponding to the second control information format indicates an invalid setting.

The transceiving module 603 is configured to send the downlink control information corresponding to the determined control information format to user equipment UE.

In some embodiments of the present disclosure, the valid setting determined by the field setting determining module 602 includes: a valid bit state, or a valid first information index, or a valid combination of the first information index and second information.

The invalid setting determined by the field setting determining module includes: an invalid bit state, or an invalid first information index, or an invalid combination of the first information index and second information.

The valid bit state indicates valid first information or the valid first information index, the invalid bit state indicates invalid first information or the invalid first information index, and the first information index is used to indicate the first information.

In some embodiments of the present disclosure, the field setting determining module 602 is specifically configured to determine the following content:

a bit location of the first field in the downlink control information corresponding to the first field is the same as a bit location of the second field in the downlink control information corresponding to the second field; or a bit location of more significant X bits of the first field in the downlink control information corresponding to the first field is the same as a bit location of the second field in the downlink control information corresponding to the second field, where X is a non-zero natural number; or a bit location of less significant X bits of the first field in the downlink control information corresponding to the first field is the same as a bit location of the second field in the downlink control information corresponding to the second field.

In some embodiments of the present disclosure, the field setting determining module 602 is specifically configured to determine the following content:

the first field includes one or more of a transport block size field, a modulation and coding scheme field, a resource allocation within narrowband field, or a padding bit field, and the second field includes one or more of a transport block size field, a modulation and coding scheme field, a resource allocation within narrowband field, or a padding bit field; or the first field includes one or more of a transport block size field, a modulation and coding scheme field, a resource allocation within narrowband field, or a padding bit field, and the second field includes one or more of a grant differentiation field, a spare bit field, or a padding bit field.

In some embodiments of the present disclosure, the field setting determining module 602 is specifically configured to determine that the valid combination of the first information index and the second information includes:

the downlink control information is used for downlink data scheduling, the first information index includes an index number being a fixed value from 0 to 9, and the second information includes a value being a fixed value of 4 or 6; and/or the downlink control information is used for downlink data scheduling, the first information index includes an index number being 10, and the second information includes a value of 4; and/or the downlink control information is used for uplink data scheduling, the first information index includes an index number being a fixed value from 0 to 10, and the second information includes a value being a fixed value of 1 or 2.

The field setting determining module is specifically configured to determine that the invalid combination of the first information index and the second information includes:

the first information index includes an index number being a fixed value of 10, 11, 12, 13, 14, or 15, and the second information includes a value of 6; and/or the downlink control information is used for downlink data scheduling, the first information index includes an index number being a fixed value from 0 to 15, and the second information includes a value being a fixed value of 1, 2, 3, or 5; and/or the downlink control information is used for uplink data scheduling, the first information index includes an index number being a fixed value from 0 to 15, and the second information includes a value being a fixed value of 3, 4, 5, or 6.

In some embodiments of the present disclosure, the field setting determining module 602 is specifically configured to determine that the valid bit state includes a state value in all four-bit state values except 1011, 1100, 1101, 1110, and 1111; and/or the field setting determining module is specifically configured to determine that the invalid bit state includes at least one state value of 1011, 1100, 1101, 1110, or 1111; and/or the field setting determining module is specifically configured to determine that the valid first information index includes an index whose index number is one of 0, 1, 2, 3, 4, 5, 6, 7, 8, 9, or 10; and/or the field setting determining module is specifically configured to determine that the invalid first information index includes an index whose index number is one of 11, 12, 13, 14, or 15.

In some embodiments of the present disclosure, the first information is a transport block size or a modulation and coding scheme; and/or the first information index is a transport block size index or a modulation and coding scheme index; and/or the second information is a quantity of resource blocks.

In some embodiments of the present disclosure, the downlink control information corresponding to the first control information format carries grant information; and/or the downlink control information corresponding to the second control information format carries control channel command information.

It can be learned from descriptions of this embodiment of the present disclosure, the control information format of the downlink control information is first determined. When the control information format of the downlink control information is the first control information format, it is determined that the first field included in the downlink control information corresponding to the first control information format indicates the valid setting. Alternatively, when the control information format of the downlink control information is the second control information format, it is determined that the second field included in the downlink control information corresponding to the second control information format indicates the invalid setting. The downlink control information corresponding to the determined control information format is finally sent to the UE. Whether the setting is valid may be indicated according to the control information format of the downlink control information by the first field or the second field included in the downlink control information. Therefore, the UE may determine, according to the first field or the second field included in the downlink control information, the control information format used by the base station, so that the UE may obtain the downlink control information according to the determined control information format. Because the first field and the second field indicate content of a fixed field carried in the downlink control information, using the control information format to indicate the content of the fixed field does not increase a payload size of the downlink control information, and can effectively differentiate the downlink control information in a coverage enhancement scenario.

Figure 7:
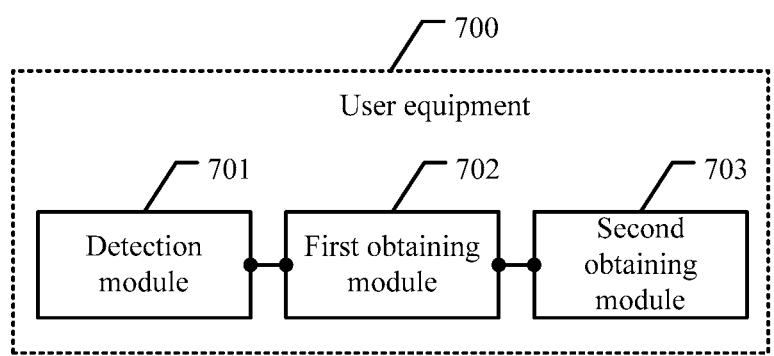
FIG. 7 is a schematic diagram of a composition structure of user equipment according to an embodiment of the present disclosure.

Referring to FIG. 7, user equipment 700 provided by an embodiment of the present disclosure may include: a detection module 701, a first obtaining module 702, and a second obtaining module 703.

The detection module 701 is configured to detect a first field included in downlink control information sent by a base station or a second field included in the downlink control information.

The first obtaining module 702 is configured to obtain the downlink control information according to a first control information format when determining that the first field included in the downlink control information indicates a valid setting.

The second obtaining module 703 is configured to obtain the downlink control information according to a second control information format when determining that the second field included in the downlink control information indicates an invalid setting.

In some embodiments of the present disclosure, the valid setting determined by the first obtaining module 702 includes: a valid bit state, or a valid first information index, or a valid combination of the first information index and second information.

The invalid setting specifically determined by the second obtaining module includes: an invalid bit state, or an invalid first information index, or an invalid combination of the first information index and second information.

The valid bit state indicates valid first information or the valid first information index, the invalid bit state indicates invalid first information or the invalid first information index, and the first information index is used to indicate the first information.

In some embodiments of the present disclosure, the detection module 701 is specifically configured to detect the following content:

a bit location of the first field in the downlink control information corresponding to the first field is the same as a bit location of the second field in the downlink control information corresponding to the second field; or a bit location of more significant X bits of the first field in the downlink control information corresponding to the first field is the same as a bit location of the second field in the downlink control information corresponding to the second field, where X is a non-zero natural number; or a bit location of less significant X bits of the first field in the downlink control information corresponding to the first field is the same as a bit location of the second field in the downlink control information corresponding to the second field.

In some embodiments of the present disclosure, the detection module 701 is specifically configured to detect the following content:

the first field includes one or more of a transport block size field, a modulation and coding scheme field, a resource allocation within narrowband field, or a padding bit field, and the second field includes one or more of a transport block size field, a modulation and coding scheme field, a resource allocation within narrowband field, or a padding bit field; or the first field includes one or more of a transport block size field, a modulation and coding scheme field, a resource allocation within narrowband field, or a padding bit field, and the second field includes one or more of a grant differentiation field, a spare bit field, or a padding bit field.

In some embodiments of the present disclosure, the first obtaining module 702 is specifically configured to determine that the valid combination of the first information index and the second information includes:

the downlink control information is used for downlink data scheduling, the first information index includes an index number being a fixed value from 0 to 9, and the second information includes a value being a fixed value of 4 or 6; and/or the downlink control information is used for downlink data scheduling, the first information index includes an index number being 10, and the second information includes a value of 4; and/or the downlink control information is used for uplink data scheduling, the first information index includes an index number being a fixed value from 0 to 10, and the second information includes a value being a fixed value of 1 or 2.

The second obtaining module 703 is specifically configured to determine that the invalid combination of the first information index and the second information includes:

the first information index includes an index number being a fixed value of 10, 11, 12, 13, 14, or 15, and the second information includes a value of 6; and/or the downlink control information is used for downlink data scheduling, the first information index includes an index number being a fixed value from 0 to 15, and the second information includes a value being a fixed value of 1, 2, 3, or 5; and/or the downlink control information is used for uplink data scheduling, the first information index includes an index number being a fixed value from 0 to 15, and the second information includes a value being a fixed value of 3, 4, 5, or 6.

In some embodiments of the present disclosure, the first obtaining module 702 is specifically configured to determine that the valid bit state includes a state value in all four-bit state values except 1011, 1100, 1101, 1110, and 1111; and/or the second obtaining module 703 is specifically configured to determine that the invalid bit state includes at least one state value of 1011, 1100, 1101, 1110, or 1111; and/or the first obtaining module 702 is specifically configured to determine that the valid first information index includes an index whose index number is one of 0, 1, 2, 3, 4, 5, 6, 7, 8, 9, or 10; and/or the second obtaining module 703 is specifically configured to determine that the invalid first information index includes an index whose index number is one of 11, 12, 13, 14, or 15.

In some embodiments of the present disclosure, the first information is a transport block size or a modulation and coding scheme; and/or the first information index is a transport block size index or a modulation and coding scheme index; and/or the second information is a quantity of resource blocks.

In some embodiments of the present disclosure, the downlink control information corresponding to the first control information format carries grant information; and/or the downlink control information corresponding to the second control information format carries control channel command information.

It can be learned from descriptions of this embodiment of the present disclosure, the UE first detects the first field or the second field included in the downlink control information sent by the base station. When determining that the first field included in the downlink control information indicates the valid setting, the UE obtains the downlink control information according to the first control information format. When determining that the second field included in the downlink control information indicates the invalid setting, the UE obtains the downlink control information according to the second control information format. Whether the setting is valid may be indicated according to the control information format of the downlink control information by the first field or the second field included in the downlink control information. Therefore, the UE may determine, according to the first field or the second field included in the downlink control information, the control information format used by the base station, so that the UE may obtain the downlink control information according to the determined control information format. Because the first field and the second field indicate content of a fixed field carried in the downlink control information, using the control information format to indicate the content of the fixed field does not increase a payload size of the downlink control information, and can effectively differentiate the downlink control information in a coverage enhancement scenario.

It should be noted that content such as information exchange between the modules/units of the apparatus and the execution processes thereof is based on the same idea as the method embodiments of the present disclosure, and produces the same technical effects as the method embodiments of the present disclosure. For details, refer to descriptions in the method embodiments of the present disclosure, and the details are not described herein again.

An embodiment of the present disclosure further provides a computer storage medium. The computer storage medium stores a program, and the program executes some or all steps in the foregoing method embodiments.

Figure 8:
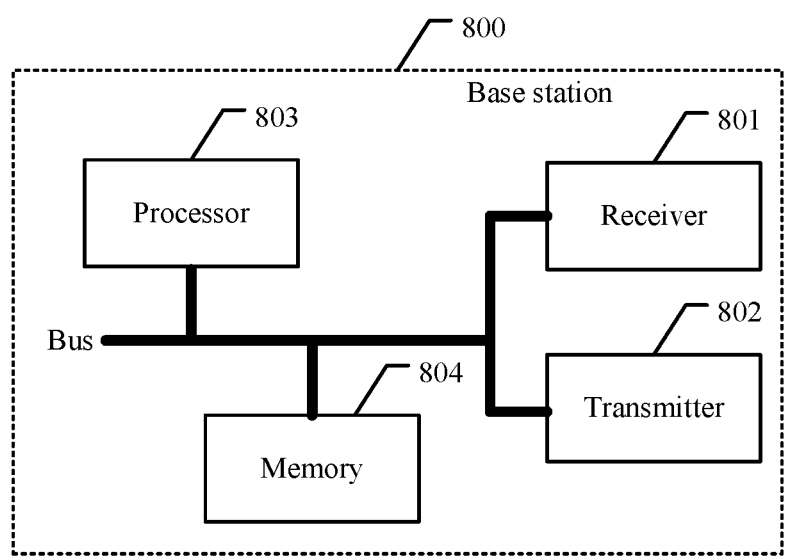
FIG. 8 is a schematic diagram of a composition structure of another base station according to an embodiment of the present disclosure.

The following describes another base station provided by an embodiment of the present disclosure. Referring to FIG. 8, the base station 800 includes:

a receiver 801, a transmitter 802, a processor 803, and a memory 804 (there may be one or more processors 803 in the base station 800, and one processor is used as an example in FIG. 8). In some embodiments of the present disclosure, the receiver 801, the transmitter 802, the processor 803, and the memory 804 may be connected by using a bus or in another manner. FIG. 8 shows an example of connection by using a bus.

The processor 803 is configured to perform the following steps:

determining a control information format of downlink control information;

when the control information format of the downlink control information is a first control information format, determining that a first field included in the downlink control information corresponding to the first control information format indicates a valid setting; or when the control information format of the downlink control information is a second control information format, determining that a second field included in the downlink control information corresponding to the second control information format indicates an invalid setting; and sending the downlink control information corresponding to the determined control information format to user equipment UE.

In some embodiments of the present disclosure, the valid setting determined by the processor 803 includes: a valid bit state, or a valid first information index, or a valid combination of the first information index and second information.

The invalid setting includes: an invalid bit state, or an invalid first information index, or an invalid combination of the first information index and second information.

The valid bit state indicates valid first information or the valid first information index, the invalid bit state indicates invalid first information or the invalid first information index, and the first information index is used to indicate the first information.

In some embodiments of the present disclosure, a bit location, determined by the processor 803, of the first field in the downlink control information corresponding to the first field is the same as a bit location of the second field in the downlink control information corresponding to the second field; or a bit location of more significant X bits of the first field in the downlink control information corresponding to the first field is the same as a bit location of the second field in the downlink control information corresponding to the second field, where X is a non-zero natural number; or a bit location of less significant X bits of the first field in the downlink control information corresponding to the first field is the same as a bit location of the second field in the downlink control information corresponding to the second field.

In some embodiments of the present disclosure, the first field determined by the processor 803 includes one or more of a transport block size field, a modulation and coding scheme field, a resource allocation within narrowband field, or a padding bit field, and the second field includes one or more of a transport block size field, a modulation and coding scheme field, a resource allocation within narrowband field, or a padding bit field; or the first field includes one or more of a transport block size field, a modulation and coding scheme field, a resource allocation within narrowband field, or a padding bit field, and the second field includes one or more of a grant differentiation field, a spare bit field, or a padding bit field.

In some embodiments of the present disclosure, the valid combination, determined by the processor 803, of the first information index and the second information includes:

the downlink control information is used for downlink data scheduling, the first information index includes an index number being a fixed value from 0 to 9, and the second information includes a value being a fixed value of 4 or 6; and/or the downlink control information is used for downlink data scheduling, the first information index includes an index number being 10, and the second information includes a value of 4; and/or the downlink control information is used for uplink data scheduling, the first information index includes an index number being a fixed value from 0 to 10, and the second information includes a value being a fixed value of 1 or 2.

The invalid combination of the first information index and the second information includes:

the first information index includes an index number being a fixed value of 10, 11, 12, 13, 14, or 15, and the second information includes a value of 6; and/or the downlink control information is used for downlink data scheduling, the first information index includes an index number being a fixed value from 0 to 15, and the second information includes a value being a fixed value of 1, 2, 3, or 5; and/or the downlink control information is used for uplink data scheduling, the first information index includes an index number being a fixed value from 0 to 15, and the second information includes a value being a fixed value of 3, 4, 5, or 6.

In some embodiments of the present disclosure, the valid bit state determined by the processor 803 includes a state value in all four-bit state values except 1011, 1100, 1101, 1110, and 1111; and/or the invalid bit state includes at least one state value of 1011, 1100, 1101, 1110, or 1111; and/or the valid first information index includes an index whose index number is one of 0, 1, 2, 3, 4, 5, 6, 7, 8, 9, or 10; and/or the invalid first information index includes an index whose index number is one of 11, 12, 13, 14, or 15.

In some embodiments of the present disclosure, the first information determined by the processor 803 is a transport block size or a modulation and coding scheme; and/or the first information index is a transport block size index or a modulation and coding scheme index; and/or the second information is a quantity of resource blocks.

In some embodiments of the present disclosure, the downlink control information that is determined by the processor 803 and that corresponds to the first control information format carries grant information; and/or the downlink control information corresponding to the second control information format carries control channel command information.

It can be learned from descriptions of this embodiment of the present disclosure, the control information format of the downlink control information is first determined. When the control information format of the downlink control information is the first control information format, it is determined that the first field included in the downlink control information corresponding to the first control information format indicates the valid setting. Alternatively, when the control information format of the downlink control information is the second control information format, it is determined that the second field included in the downlink control information corresponding to the second control information format indicates the invalid setting. The downlink control information corresponding to the determined control information format is finally sent to the UE. Whether the setting is valid may be indicated according to the control information format of the downlink control information by the first field or the second field included in the downlink control information. Therefore, the UE may determine, according to the first field or the second field included in the downlink control information, the control information format used by the base station, so that the UE may obtain the downlink control information according to the determined control information format. Because the first field and the second field indicate content of a fixed field carried in the downlink control information, using the control information format to indicate the content of the fixed field does not increase a payload size of the downlink control information, and can effectively differentiate the downlink control information in a coverage enhancement scenario.

Figure 9:
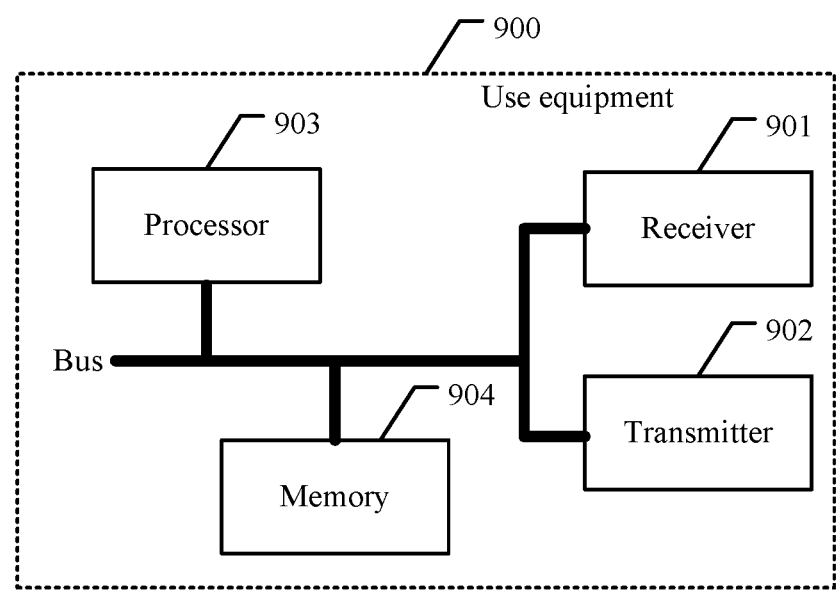
FIG. 9 is a schematic diagram of a composition structure of another user equipment according to an embodiment of the present disclosure.

The following describes another user equipment provided by an embodiment of the present disclosure. Referring to FIG. 9, the user equipment 900 includes:

a receiver 901, a transmitter 902, a processor 903, and a memory 904 (there may be one or more processors 903 in the user equipment 900, and one processor is used as an example in FIG. 9). In some embodiments of the present disclosure, the receiver 901, the transmitter 902, the processor 903, and the memory 904 may be connected by using a bus or in another manner. FIG. 9 shows an example of connection by using a bus.

The processor 903 is configured to perform the following steps:

detecting a first field included in downlink control information sent by a base station or a second field included in the downlink control information;

when it is determined that the first field included in the downlink control information indicates a valid setting, obtaining the downlink control information according to a first control information format; and when it is determined that the second field included in the downlink control information indicates an invalid setting, obtaining the downlink control information according to a second control information format.

In some embodiments of the present disclosure, the valid setting determined by the processor 903 includes: a valid bit state, or a valid first information index, or a valid combination of the first information index and second information.

The invalid setting includes: an invalid bit state, or an invalid first information index, or an invalid combination of the first information index and second information.

The valid bit state indicates valid first information or the valid first information index, the invalid bit state indicates invalid first information or the invalid first information index, and the first information index is used to indicate the first information.

In some embodiments of the present disclosure, a bit location, determined by the processor 903, of the first field in the downlink control information corresponding to the first field is the same as a bit location of the second field in the downlink control information corresponding to the second field; or a bit location of more significant X bits of the first field in the downlink control information corresponding to the first field is the same as a bit location of the second field in the downlink control information corresponding to the second field, where X is a non-zero natural number; or a bit location of less significant X bits of the first field in the downlink control information corresponding to the first field is the same as a bit location of the second field in the downlink control information corresponding to the second field.

In some embodiments of the present disclosure, the first field determined by the processor 903 includes one or more of a transport block size field, a modulation and coding scheme field, a resource allocation within narrowband field, or a padding bit field, and the second field includes one or more of a transport block size field, a modulation and coding scheme field, a resource allocation within narrowband field, or a padding bit field; or the first field includes one or more of a transport block size field, a modulation and coding scheme field, a resource allocation within narrowband field, or a padding bit field, and the second field includes one or more of a grant differentiation field, a spare bit field, or a padding bit field.

In some embodiments of the present disclosure, the valid combination, determined by the processor 903, of the first information index and the second information includes:

the downlink control information is used for downlink data scheduling, the first information index includes an index number being a fixed value from 0 to 9, and the second information includes a value being a fixed value of 4 or 6; and/or the downlink control information is used for downlink data scheduling, the first information index includes an index number being 10, and the second information includes a value of 4; and/or the downlink control information is used for uplink data scheduling, the first information index includes an index number being a fixed value from 0 to 10, and the second information includes a value being a fixed value of 1 or 2.

The invalid combination of the first information index and the second information includes:

the first information index includes an index number being a fixed value of 10, 11, 12, 13, 14, or 15, and the second information includes a value of 6; and/or the downlink control information is used for downlink data scheduling, the first information index includes an index number being a fixed value from 0 to 15, and the second information includes a value being a fixed value of 1, 2, 3, or 5; and/or the downlink control information is used for uplink data scheduling, the first information index includes an index number being a fixed value from 0 to 15, and the second information includes a value being a fixed value of 3, 4, 5, or 6.

In some embodiments of the present disclosure, the valid bit state determined by the processor 903 includes a state value in all four-bit state values except 1011, 1100, 1101, 1110, and 1111; and/or the invalid bit state includes at least one state value of 1011, 1100, 1101, 1110, or 1111; and/or the valid first information index includes an index whose index number is one of 0, 1, 2, 3, 4, 5, 6, 7, 8, 9, or 10; and/or the invalid first information index includes an index whose index number is one of 11, 12, 13, 14, or 15.

In some embodiments of the present disclosure, the first information determined by the processor 903 is a transport block size or a modulation and coding scheme; and/or the first information index is a transport block size index or a modulation and coding scheme index; and/or the second information is a quantity of resource blocks.

In some embodiments of the present disclosure, the downlink control information that is determined by the processor 903 and that corresponds to the first control information format carries grant information; and/or the downlink control information corresponding to the second control information format carries control channel command information.

It can be learned from descriptions of this embodiment of the present disclosure, the UE first detects the first field or the second field included in the downlink control information sent by the base station. When determining that the first field included in the downlink control information indicates the valid setting, the UE obtains the downlink control information according to the first control information format. When determining that the second field included in the downlink control information indicates the invalid setting, the UE obtains the downlink control information according to the second control information format. Whether the setting is valid may be indicated according to the control information format of the downlink control information by the first field or the second field included in the downlink control information. Therefore, the UE may determine, according to the first field or the second field included in the downlink control information, the control information format used by the base station, so that the UE may obtain the downlink control information according to the determined control information format. Because the first field and the second field indicate content of a fixed field carried in the downlink control information, using the control information format to indicate the content of the fixed field does not increase a payload size of the downlink control information, and can effectively differentiate the downlink control information in a coverage enhancement scenario.

In addition, it should be noted that the described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. In addition, in the accompanying drawings of the apparatus embodiments provided by the present disclosure, connection relationships between modules indicate that the modules have communication connections with each other, which may be specifically implemented as one or more communications buses or signal cables. A person of ordinary skill in the art may understand and implement the embodiments of the present disclosure without creative efforts.

Based on the descriptions of the foregoing implementations, a person skilled in the art may clearly understand that the present disclosure may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for the present disclosure, software program implementation is a better implementation in most cases. Based on such an understanding, the technical solutions of the present disclosure essentially or the part contributing to the prior art may be implemented in a form of a software product. The software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, and the like) to perform the methods described in the embodiments of the present disclosure.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A control information format processing method, comprising:
    determining a control information format of downlink control information;
    in response to determining that the control information format of the downlink control information is a first control information format and the downlink control information corresponding to the first control information format carries grant information,
        setting a modulation and coding scheme (MCS) field in the downlink control information to a valid MCS index or setting the most significant 2 bits of the MCS filed in the downlink control information to be not 11; or
    in response to determining that the control information format of the downlink control information is a second control information format and the downlink control information corresponding to the second control information format carries control channel command information, setting reserved bits comprised in the downlink control information to an invalid MCS index or setting the most significant 2 bits of the reserved bits in the downlink control information to be 11; and
    sending the downlink control information to user equipment (UE).

2. The method according to claim 1, wherein:
    wherein a bit location of the MCS field in the downlink control information corresponding to the MCS field is the same as a bit location of the reserved bits in the downlink control information corresponding to the reserved bits; or
    wherein a bit location of the most significant X bits of the MCS field in the downlink control information corresponding to the MCS field is the same as a bit location of the most significant X bits of the reserved bits in the downlink control information corresponding to the reserved bits.

3. The method according to claim 1, wherein the valid MCS index comprises an index number being a value from 0 to 9.

4. The method according to claim 2, wherein the invalid MCS index is an index whose index number is one of 11, 12, 13, 14, or 15.

5. A control information format processing method, comprising:
    detecting downlink control information sent by a base station, wherein the downlink control information comprises a MCS field or a reserved bit field;
    when the MCS field comprised in the downlink control information indicates a valid MCS index or the most significant 2 bits of the MCS field are not 11, obtaining the downlink control information according to a first control information format to obtain grant information; and
    when the reserved bit field comprised in the downlink control information indicates an invalid MCS index or the most significant 2 bits of the MCS field are 11, obtaining the downlink control information according to a second control information format to obtain control channel command information.

6. The method according to claim 5, wherein:
    wherein a bit location of the MCS field in the downlink control information corresponding to the MCS field is the same as a bit location of the reserved bits in the downlink control information corresponding to the reserved bits; or
    wherein a bit location of the most significant X bits of the MCS field in the downlink control information corresponding to the MCS field is the same as a bit location of the most significant X bits of the reserved bits in the downlink control information corresponding to the reserved bits.

7. The method according to claim 5, wherein
the valid MCS index comprises an index number being a value from 0 to 9.

8. The method according to claim 6, wherein:
the invalid MCS index is an index whose index number is one of 11, 12, 13, 14, or 15.

9. An apparatus, comprising:
one or more processors;
a non-transitory memory for storing computer instructions that when executed by the one or more processors cause the apparatus to perform the steps of:
    detecting downlink control information sent by a base station, wherein the downlink control information comprises a MCS field or a reserved bit field;
    when the MCS field comprised in the downlink control information indicates a valid MCS index or the most significant 2 bits of the MCS field are not 11, obtaining the downlink control information according to a first control information format to obtain grant information; and when the reserved bit field comprised in the downlink control information indicates an invalid MCS index or the most significant 2 bits of the MCS field are 11, obtaining the downlink control information according to a second control information format to obtain control channel command information.

10. The apparatus according to claim 9, wherein:

wherein a bit location of the MCS field in the downlink control information corresponding to the MCS field is the same as a bit location of the reserved bits in the downlink control information corresponding to the reserved bits; or wherein a bit location of the most significant X bits of the MCS field in the downlink control information corresponding to the MCS field is the same as a bit location of the most significant X bits of the reserved bits in the downlink control information corresponding to the reserved bits.

11. The apparatus according to claim 9, wherein the valid MCS index comprises an index number being a value from 0 to 9.

12. The apparatus according to claim 10, wherein:

the invalid MCS index is an index whose index number is one of 11, 12, 13, 14, or 15.

13. An apparatus, comprising:

one or more processors; and a non-transitory memory for storing computer instructions that when executed by the one or more processors cause the apparatus to perform operations comprising:

determining a control information format of downlink control information;

in response to determining that the control information format of the downlink control information is a first control information format and the downlink control information corresponding to the first control information format carries grant information, setting a modulation and coding scheme (MCS) field in the downlink control information to a valid MCS index or setting the most significant 2 bits of the MCS filed in the downlink control information to be not 11; or in response to determining that the control information format of the downlink control information is a second control information format and the downlink control information corresponding to the second control information format carries control channel command information, setting reserved bits comprised in the downlink control information to an invalid MCS index or setting the most significant 2 bits of the reserved bits in the downlink control information to be 11; and sending the downlink control information to user equipment (UE).

14. The apparatus according to claim 13, wherein:

wherein a bit location of the MCS field in the downlink control information corresponding to the MCS field is the same as a bit location of the reserved bits in the downlink control information corresponding to the reserved bits; or wherein a bit location of the most significant X bits of the MCS field in the downlink control information corresponding to the MCS field is the same as a bit location of the most significant X bits of the reserved bits in the downlink control information corresponding to the reserved bits.

15. The apparatus according to claim 13, wherein the valid MCS index comprises an index number being a value from 0 to 9.

16. The apparatus according to claim 13, wherein the invalid MCS index is an index whose index number is one of 11, 12, 13, 14, or 15.

* * * * *